(12) United States Patent
Guim Bernat et al.

(10) Patent No.: US 12,132,664 B2
(45) Date of Patent: Oct. 29, 2024

(54) METHODS AND APPARATUS TO SCHEDULE SERVICE REQUESTS IN A NETWORK COMPUTING SYSTEM USING HARDWARE QUEUE MANAGERS

(71) Applicant: Intel Corporation, Santa Clara, CA (US)

(72) Inventors: Francesc Guim Bernat, Barcelona (ES); Karthik Kumar, Chandler, AZ (US); Suraj Prabhakaran, Aachen (DE); Ignacio Astilleros Diez, Madrid (ES); Timothy Verrall, Pleasant Hill, CA (US)

(73) Assignee: INTEL CORPORATION, Santa Clara, CA (US)

( * ) Notice: Subject to any disclaimer, the term of this patent is extended or adjusted under 35 U.S.C. 154(b) by 144 days.

(21) Appl. No.: 18/068,409

(22) Filed: Dec. 19, 2022

(65) Prior Publication Data
US 2023/0142539 A1    May 11, 2023

Related U.S. Application Data

(63) Continuation of application No. 16/958,684, filed as application No. PCT/US2018/025327 on Mar. 30, 2018, now Pat. No. 11,533,268.

(51) Int. Cl.
| | |
|---|---|
| *H04L 47/50* | (2022.01) |
| *H04L 67/10* | (2022.01) |
| *H04L 67/2866* | (2022.01) |
| *H04L 67/60* | (2022.01) |
| *H04L 49/90* | (2022.01) |

(52) U.S. Cl.
CPC .............. *H04L 47/50* (2013.01); *H04L 67/10* (2013.01); *H04L 67/2866* (2013.01); *H04L 67/60* (2022.05); *H04L 49/90* (2013.01)

(58) Field of Classification Search
CPC ......... H04L 47/50; H04L 67/10; H04L 67/60; H04L 67/2866
See application file for complete search history.

(56) References Cited

U.S. PATENT DOCUMENTS

| | | |
|---|---|---|
| 2003/0105903 A1 | 6/2003 | Garnett et al. |
| 2012/0331147 A1 | 12/2012 | Dutta et al. |

(Continued)

FOREIGN PATENT DOCUMENTS

| | | |
|---|---|---|
| WO | 2018030924 | 2/2018 |
| WO | 2019190545 | 10/2019 |

OTHER PUBLICATIONS

International Searching Authority, "International Search Report," mailed Dec. 12, 2018 in connection with International Patent Application No. PCT/US2018/025327, 5 pages.

(Continued)

*Primary Examiner* — Kevin C. Harper
(74) *Attorney, Agent, or Firm* — HANLEY, FLIGHT & ZIMMERMAN, LLC

(57) ABSTRACT

Example edge gateway circuitry to schedule service requests in a network computing system includes: gateway-level hardware queue manager circuitry to: parse the service requests based on service parameters in the service requests; and schedule the service requests in a queue based on the service parameters, the service requests received from client devices; and hardware queue manager communication interface circuitry to send ones of the service requests from the queue to rack-level hardware queue manager circuitry in a physical rack, the ones of the service requests corresponding to functions as a service provided by resources in the physical rack.

25 Claims, 8 Drawing Sheets

(56) References Cited

U.S. PATENT DOCUMENTS

| | | | |
|---|---|---|---|
| 2015/0067689 | A1 | 3/2015 | Kuraishi et al. |
| 2017/0075572 | A1 | 3/2017 | Utevsky et al. |
| 2017/0134217 | A1 | 5/2017 | Ahmed et al. |
| 2017/0228337 | A1 | 8/2017 | Zhang et al. |
| 2017/0286337 | A1 | 10/2017 | Wang et al. |
| 2017/0289242 | A1 | 10/2017 | Keppel et al. |
| 2018/0034924 | A1 | 2/2018 | Norwood |
| 2019/0163511 | A1* | 5/2019 | Sakalanaga ............... G06F 9/54 |
| 2020/0412835 | A1 | 12/2020 | Xu et al. |

OTHER PUBLICATIONS

International Searching Authority, "Written Opinion," mailed Dec. 12, 2018 in connection with International Patent Application No. PCT/US2018/025327, 13 pages.

Baldini et al., "Serverless Computing: Current Trends and Open Problems," arXiv; 1706.03178v1 [cs.DC] Jun. 10, 2017, 20 pages.

Amazon Web Services, "Optimizing Enterprise Economics with Serverless Architectures," Oct. 2017, 25 pages.

Yi et al., "LAVEA: Latency-aware Video Analytics on Edge Computing Platform," SEC '17, Oct. 12-14, 2017, San Jose, CA, 13 pages.

International Bureau, "International Preliminary Report on Patentability," mailed Oct. 15, 2020 in connection with International Patent Application No. PCT/US2018/025327, 15 pages.

United States Patent and Trademark Office, "Non-Final Office Action, " issued in connection with U.S. Appl. No. 16/958,684, dated Jan. 27, 2022, 12 pages.

United States Patent and Trademark Office, "Notice of Allowance," issued in connection with U.S. Appl. No. 16/958,684, dated Aug. 12, 2022, 7 pages.

United States Patent and Trademark Office, "Supplemental Notice of Allowability," issued in connection with U.S. Appl. No. 16/958,684, dated Aug. 23, 2022, 2 pages.

* cited by examiner

METHODS AND APPARATUS TO SCHEDULE SERVICE REQUESTS IN A NETWORK COMPUTING SYSTEM USING HARDWARE QUEUE MANAGERS

RELATED APPLICATION

This patent arises from a continuation of U.S. patent application Ser. No. 16/958,684 (now U.S. Pat. No. 11,533, 268), which was filed on Jun. 27, 2020, which is a national stage entry of PCT Application No. PCT/US2018/025327, which was filed on Mar. 30, 2018. U.S. patent application Ser. No. 16/958,684 and PCT Application No. PCT/US2018/025327 are hereby incorporated herein by reference in their entireties. Priority to U.S. patent application Ser. No. 16/958,684 and PCT Application No. PCT/US2018/025327 is hereby claimed.

FIELD OF THE DISCLOSURE

This disclosure is generally related to network computing systems, and more specifically directed to methods and apparatus to schedule service requests in a network computing system using hardware queue managers.

BACKGROUND

In edge cloud architectures, telecom service providers (TSPs) and communication service providers (CSPs) can offer cloud-based computing services such as Function as a Service (FaaS) and Accelerated Function as a Service (AFaaS). With such offerings, customers request certain functions to be executed in the cloud that either cannot be or are more expensive to be executed on a client device. Some examples are image search/processing (e.g., for use in augmented reality (AR)), autonomous self-driving cars in which computing functions overtake autonomous driving maneuvers, etc. To use FaaS and AFaaS services, a client device sends a request, including pertinent data, to a network address corresponding to the FaaS or AFaaS. Cloud resources at the network address are then allocated to perform the requested FaaS or AFaaS and return a result of the executed operation. The request transmission, computation, and result transmission back to the client device require time referred to as latency. When a client device uses such a FaaS or AFaaS, the cloud-based service incurs a corresponding latency that the client device must account for in achieving a desired or required performance for its local functions.

Figure 1:
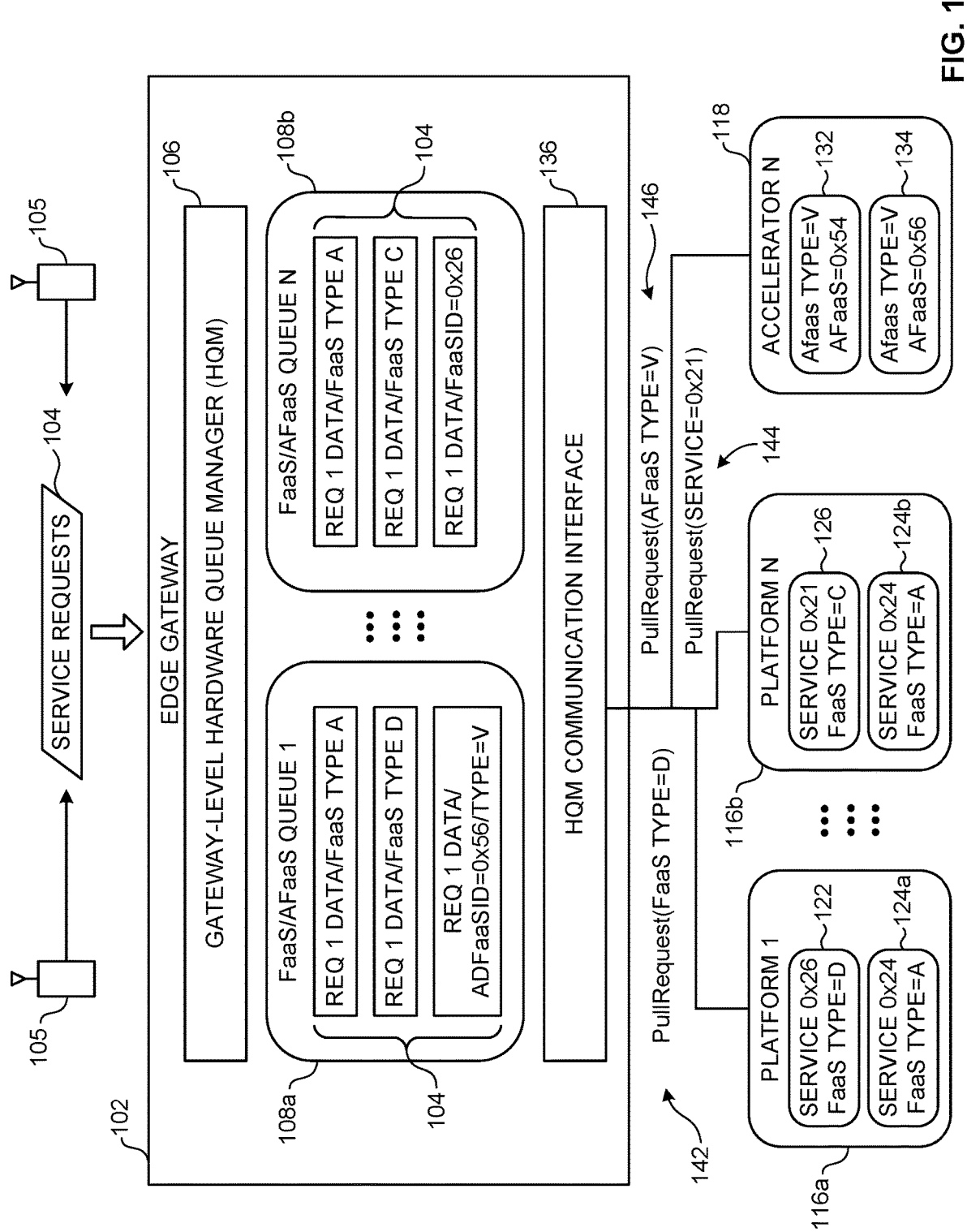
FIG. 1 illustrates an example edge gateway that includes a gateway hardware queue manager to schedule service requests to be scheduled at the edge gateway and serviced by resources in communication with the edge gateway.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Examples disclosed herein schedule service requests in a network computing system using hardware queue managers. Examples disclosed herein may be used in cloud computing systems implemented using edge gateways in circuit with physical racks that include drawers of physical resources. Example service requests that can be scheduled using techniques disclosed herein correspond to cloud-based computing services such as Function as a Service (FaaS) and Accelerated Function as a Service (AFaaS) offered by cloud service providers. An FaaS provides a software-based function that executes at resources of drawers in physical racks in communication with edge gateways. An AFaaS service provides a hardware-based function that is implemented using one or more hardware accelerators (e.g., field programmable gate arrays (FPGAs), application specific integrated circuits (ASICs), etc.) in drawers of physical racks in communication with edge gateways. Cloud-based computing services can include FaaS/AFaaS services to enable faster and/or more powerful computing capabilities than can be achieved using local computing resources of client devices. For example, some client devices such as Internet-of-Things (IoT) client devices may be designed with low-power hardware resources that are limited in their computational performance. As such, IoT client devices can perform computationally light workloads on their local hardware while offloading computationally intensive workloads to FaaS/AFaaS services of a cloud computing system. Example technologies that can use FaaS/AFaaS services include IoT devices, mobile computing, wearable technologies, autonomous self-driving cars, unmanned aerial vehicles (UAVs), distributed process control systems, field sensors, security monitoring systems, etc.

Different workloads of client devices have different latency requirements (e.g., turnaround time requirements). Some workloads have flexible latency requirements, while other workloads have fast, strict latency requirements (e.g., typically less than 20 ms). In more performance-demanding workloads (e.g., IoT client devices, autonomous self-driving cars, UAVs, etc.), latency requirements can be less than two milliseconds (ms). Prior techniques place FaaS/AFaaS services at the edge of a network to decrease associated latencies. A network edge is the point at which a core network (e.g., a central office, a data center, a cloud network, etc.) meets a wide area network (WAN) (e.g., the Internet, a telecommunications network, etc.). In some examples, edge gateways are used at the edge of a network to connect the core network to the WAN. A FaaS/AFaaS latency can be measured as a one-way latency or a two-way latency. A one-way latency is the amount of time that elapses between the sending of a service request from a client device to the receiving of the service request at a destination (e.g., at an edge gateway or at a resource that will provide a function as a service). A two-way latency (e.g., a turnaround time, a round-trip latency, etc.) is the amount of time that elapses between the sending of a service request from a client device to the receiving of a result at the client device from a network-based computing resource that generated the result based on servicing the service request.

In addition to travel times of service requests and responses, two-way latency also includes: (i) the amount of time required for scheduling and resource management (e.g., function scheduling of the requested function and allocating resources to perform the requested function) of the function requested in the service request, and (ii) the amount of computation time required by the service provider to perform the requested function. In data centers, prior techniques for resource management, function scheduling and orchestration is achieved through software. Such software-based scheduling solutions typically accept user requests for FaaS/AFaaS services as function as a service submissions and then schedule the functions in the set of resources that are available in a cluster of servers in a data center. Scheduling one function through software-based scheduling usually takes about 2-5 ms. Therefore, using such prior techniques in edge cloud architectures would not satisfy high-performance turnaround time requirements of less than 2 ms. Since computation times of workloads are variable for different use cases, improving computation times in a way that provides deterministic improvements on latencies is difficult since different types of FaaS/AFaaS services will require different computation times, and more performance-demanding FaaS/AFaaS services will require higher computation times. As such, examples disclosed herein are directed to improving scheduling and resource management times for FaaS/AFaaS services to make more deterministic and more significant impacts on reducing latencies of such FaaS/AFaaS services. In this manner, examples disclosed herein can be used to meet higher performance requirements related to quality of service (QoS) and service level agreements (SLAs) (e.g., priority levels of functions, preemption of utilized resources, etc.) of FaaS/AFaaS services.

Examples disclosed herein use hardware queue managers (HQMs) to schedule servicing of FaaS/AFaaS service requests to decrease scheduling and resource management times relative to prior techniques and, thus, contribute to overall lower two-way latencies associated with FaaS/AFaaS service requests made by client devices to a network computing system such as a cloud computing system. For example, hardware queue managers disclosed herein are useable as gateway-level HQMs implemented at the edge of a cloud computing system or at the edge of a data center, as rack-level HQMs implemented at switches of physical racks, and/or as drawer-level HQMs implemented in drawers of physical racks. Examples disclosed herein may be used in connection with different types of network edges including base stations edge gateways, central office edge gateways, regional point of presence (POP) edge gateways, etc.

FIG. 1 illustrates an example edge gateway 102 that schedules service requests 104 for functions as a service (e.g., FaaS and/or AFaaS services) provided by resources in drawers (e.g., the drawers 208a,b of FIG. 2A) of one or more physical racks (e.g., the physical rack 204 of FIG. 2A) in communication with the edge gateway 102 and/or of one or more physical racks associated with other edge gateways (e.g., the peer edge gateways 302, 304 of FIG. 3) that are in communication with the edge gateway 102. In the illustrated example, the edge gateway 102 receives the service requests 104 from client devices 105. To schedule such service requests 104, examples disclosed herein provide hardware queue managers (HQMs) at three different levels that include: (i) an edge gateway level, (ii) a rack level, and (iii) a drawer level. For example, the edge gateway 102 includes an example gateway-level HQM 106 and includes a first queue 108a and a second queue 108b in which the gateway-level HQM 106 schedules the service requests 104. Although only two queues 108a,b are shown, any number of queues may be provided. The example client devices 105 may be IoT devices, digital cameras, mobile computing devices, smartphones, smart watches, wearable technologies, media players, autonomous self-driving cars, UAVs, distributed process control system components, field sensors, security monitoring systems, etc.

The example gateway-level HQM 106 is the top-most HQM 106 and schedules the service requests 104 in the queues 108a,b for sending to lower-level HQMs (e.g., rack-level HQMs and drawer-level HQMs) and/or HQMs of other edge gateways. For example, the client devices 105 provide service parameters in the service requests 104 that are indicative of at least one of deadlines or round-trip latencies by which results of corresponding ones of the service requests 104 are to be received at corresponding ones of the client devices 105. Client devices 105 may specify deadlines as future timestamp values stored in fields of service requests 104. To specify round-trip latencies, client devices 105 may store round-trip latency duration values in fields of service requests 104, and the client devices 105 may also store start timestamps in the service requests 104 indicative of times at which the client devices 105 sent the service requests 104. In this manner, the gateway-level HQM 106 can determine the amount of time that has elapsed since the time the client device 105 sent the service request 104 to identify how much time remains to provide a result to the client device 105. Example service parameters can also include service type identifiers and/or service identifiers indicative of what functions as a service are being requested in the corresponding service requests 104. A service type identifier indicates a type of a function as a service that is being requested in a service request 104 (e.g., ServiceType="ImageProcessing"). A service identifier indicates a specific instance of a function as a service that is being requested in a service request 104 (e.g., Service="ImageProcessingFaceRecognition"). The service type identifiers and the service identifiers may be stored by the client devices 105 in fields of the service requests 104.

The example client devices 105 may send the service requests 104 based on a uniform resource locator (URL) or an internet protocol (IP) address of the edge gateway 102. An example format that the client devices 105 can use to generate the service requests 104 may be in the form of "ExecFaaS(FuncID, Payload or Inputs, Service Provider ID, Tenant ID, Max Cost, Result Time, Priority ID, SLA ID, Resource Type)," which includes a number of service parameters as follows. In this example format, the "FuncID" service parameter specifies a service type identifier or a service identifier of a function as a service to which a service request 104 is directed. The example "Payload or Inputs" service parameter includes data to be processed by the requested function as a service. The example "Service Provider ID" service parameter specifies an FaaS/AFaaS service provider that is to provide the requested function as a service. Such service provider may be the provider to which users subscribe to access functions as a service. The example "Tenant ID" service parameter identifies the subscriber/customer of FaaS/AFaaS services. The example "Max Cost" service parameter specifies a maximum cost that is to be incurred by the requested function as a service to service the service request 104. In this example, the maximum cost is a monetary amount incurred by one or more resources to process a function as a service in an amount of computation time. For example, the "Max Cost" service parameter may specify that a service request 104 can incur up to 100 monetary units (e.g., U.S. dollars), which would allow the service request 104 to be processed by a Xeon processor in a computation time of 40 nanoseconds (ns). As another example, the "Max Cost" service parameter may specify that a service request 104 can incur up to 400 monetary units (e.g., U.S. dollars), which would allow the service request 104 to be processed by an FPGA in a faster computation time of 15 ns. In other examples, any other suitable measure of cost may be used for the "Max Cost" service parameter.

The example "Result Time" service parameter specifies a deadline or a round-trip latency defining a time-constraint by which a result of a function as a service is expected to be received at a requesting client device 105. As such, the "Result Time" service parameter corresponds to a deadline service parameter or a round-trip latency service parameter of the service request 104. In other examples, the "Result Time" service parameter may be omitted from the service request 104, and a deadline service parameter or a round-trip latency service parameter may instead be provided via the "SLA ID" service parameter as described below. The example "Priority ID" service parameter is to identify a priority level or priority policy that specifies a priority that should be assigned to the corresponding service request 104. In some examples, the "priority ID" service parameter is expressed as a "high priority," a "normal priority," a "low priority," and/or a numeric-based priority (e.g., "1" being the highest priority and "10" being the lowest priority). In other examples, the "Priority ID" service parameter is a priority policy identifier of a priority policy stored in one or more of the HQMs 106, 202, 206a,b of FIGS. 1, 2A, and 2B. In such examples, the stored priority policy specifies the priority that is to be assigned to the service request 104. For example, the priority in the priority policy may correspond to the "FuncID" service parameter, the "Service Provider ID" service parameter, the "Tenant ID" service parameter, or the "Resource Type" service parameter of the service request 104. The "SLA ID" service parameter is to identify a service level agreement (SLA) that specifies a quality of service (QoS) that should be provided for the corresponding service request 104. For example, the "SLA ID" service parameter is an SLA identifier of a SLA stored in one or more of the HQMs 106, 202, 206a,b of FIGS. 1, 2A, and 2B. In such examples, the stored SLA specifies the QoS level for the service request 104 based on, for example, "FuncID" service parameter, the "Service Provider ID" service parameter, the "Tenant ID" service parameter, or the "Resource Type" service parameter of the service request 104. In some examples, the SLA specifies a QoS level as a deadline or a round-trip latency defining a time-constraint by which a result of a function as a service is expected to be received at a requesting client device 105. In such examples, the "SLA ID" service parameter corresponds to a deadline service parameter or a round-trip latency service parameter of the service request 104, and the "Result Time" service parameter may be omitted from the service request 104. The example "Resource Type" service parameter is to identify a type of resource that is to perform the function as a service requested by the service request 104. Example types of resources include platform resources and hardware acceleration resources. Example platform resources involve software executed by processors (e.g., Xeon processors). Example hardware acceleration resources include logic circuits (e.g., FPGAs, ASICs, etc.) configured to perform functions as a service.

To schedule the service requests 104 in the queues 108a,b, the gateway-level HQM 106: (1) parses the service requests based on the service parameters in the service requests 104, and (2) organizes the service requests 104 in the queues 108a,b based on the service parameters. For example, the gateway-level HQM 106 may store ones of the service requests 104 with shorter round-trip latencies and/or with deadlines that will expire in shorter amounts of time at or near the top of a queue 108a,b. In some examples, the gateway-level HQM 106 organizes service requests 104 across different queues 108a,b based on service type identifiers and/or service identifiers. For example, one of the queues 108a,b may be used by the gateway-level HQM 106 to store ones of the service requests 104 having service type identifiers and/or service identifiers indicative functions as a service provided by one resource, another one of the queues 108a,b may be used by the gateway-level HQM 106 to store ones of the service requests 104 having service type identifiers and/or service identifiers indicative of functions as a service provided by another resource, and yet other queues may be used by the gateway-level HQM 106 to store ones of the service requests 104 based on respective service type identifiers and/or service identifiers indicative of functions as a service provided by yet other resources.

In the illustrated example of FIG. 1, a plurality of resources 116a, 116b, and 118 are shown in communication with the edge gateway 102. Ones of the resources 116a,b and 118 may be resources of physical racks in communication with the edge gateway 102 (e.g., application(s), OS(s), server(s), central processing units (CPU(s)), network interface cards (NIC(s)), hardware acceleration device(s), graphics processing units (GPU(s)), memory device(s), storage device(s), etc.), and others of the resources 116a,b and 118 may be resources of physical racks corresponding to other, peer edge gateways that are in communication with the edge gateway 102.

In some examples, one or more of the resources 116a,b and 118 may be implemented in the edge gateway 102 and/or in other computing resources that can be located closer to client devices at which data originates. In this manner, although some examples disclosed herein are associated with functions as a service provided by resources in physical racks of a data center, examples disclosed herein may additionally or alternatively be used to implement edge computing and/or fog computing solutions in which computing resources located at a network edge provide functions as a service sufficiently close to client devices to reduce associated latencies and to reduce the amount of data that is communicated back to cloud data centers. For example, functions as a service may be implemented by computing resources in fog nodes (e.g., a fog server) or at the edge gateway 102 at a network edge so that data from client devices need only be communicated to the fog servers or to the edge gateway 102 to provide the functions as a service without needing to communicate such data through network resources to the cloud and so that corresponding results may be delivered faster to client devices. Thus, examples disclosed herein may be implemented in networked environments such as multi-access edge computing, fog node computing, and/or any other kind of network-based computing in which functions as a service are implemented in intermediate nodes (e.g., at an edge gateway or between the edge gateway 102 and a cloud data center) instead of or in addition to communicating client device data to the cloud.

Example edge computing solutions or fog computing solutions that may be implemented using examples disclosed herein include providing and scheduling functions as a service at distributed computing resources in edge nodes across a network to implement smart cities that support autonomous driving, IoT device computing, etc. In such examples, functions as a service are provided at local nodes or edge servers (e.g., on street corners, in in alleyways along utility easements, etc.). Other example edge computing solutions or fog computing solutions that may be implemented using examples disclosed herein include providing and scheduling functions as a service at local edge cloud servers and/or micro data centers. For example, micro data centers can be implemented as on-premise public clouds and/or private clouds close to where data originates. Functions as a service can be scheduled at such micro data centers as disclosed herein for local data processing to decrease latencies associated with such functions as a service. In this manner, when applications and/or devices generate large amounts of data to be processed by functions as a service, such functions as a service can be scheduled as disclosed herein at micro data centers and/or local edge cloud servers to provide low-latency results. Thus, examples disclosed herein may be used to implement functions as a service in a data center at the cloud level and/or to provide functions as a service that have been moved or ported to computing resources at the edge of a network. In some examples, such functions as a service performed at edge computing or fog computing resources have reduced functionality to enable such local physicality but retain sufficient functionality to provide desired results while decreasing the latencies associated with providing such results to client devices. Decreased latencies are particularly useful to uses requiring short response times such as autonomous driving applications, augmented reality applications, etc.

In the example of FIG. 1, platform 1 resource(s) 116a through platform N resource(s) 116b represent resources accessed via N number of platforms that can be accessed through one or more of hypervisor platform(s), guest OS platform(s), and/or container platform(s). A hypervisor is software that executes on a host OS or on "bare metal" of a server or drawer of hardware resources (e.g., without an intermediary host OS between the server/hardware and the hypervisor) to create a virtual environment for one or more virtual machines in which guest OS platform(s) run. The hypervisor virtualizes hardware resources of the server or the drawer for access by functions as a service that run on the hypervisor and/or that run on the guest OS platform(s). A container platform enables instantiating multiple containerized applications on a container runtime that executes in a host OS. The containers are logically separated from one another and from the container runtime environment in which they run. Each container executes a separate application. Since the containers are logically separated from one another, the applications cannot access applications or corresponding data in other containers. However, containers can provide their applications as resources for functions as a service, and they have access to underlying hardware resources to execute functions as a service.

The example accelerator N resource(s) 118 represents N number of hardware acceleration resources available in drawers of physical racks. Example hardware acceleration resources that may be used to implement the accelerator N resource(s) 118 include FPGAs, ASICs, and/or any other type of logic circuit that may be configured to provide a function as a service. In some examples, ones of the accelerator N resource(s) 118 are implemented in the same rack(s) and/or in the same drawer(s) as ones of the platform 1 resource(s) 116a through platform N resource(s) 116b. In other examples, the accelerator N resource(s) 118 are implemented in separate rack(s) and/or in separate drawer(s) from rack(s) and/or drawer(s) in which the platform 1 resource(s) 116a through platform N resource(s) 116b are implemented.

In the illustrated example of FIG. 1, each of the resources 116a,b, 118 includes a plurality of functions as a service that are identified via respective service type identifiers and/or service identifiers. For example, the platform 1 resource(s) 116a includes a FaaS Type D function as a service 122 and a first FaaS Type A function as a service 124a, and the platform N resource(s) 116b includes a FaaS Type C function as a service 126 and a second FaaS Type A function as a service 124b. The example FaaS Type D function as a service 122 is identified by service identifier 0x26, the example FaaS Type C function as a service 126 is identified by service identifier 0x21, and the example first and second FaaS Type A functions as a service 124a,b are identified by service identifier 0x24. In the illustrated example, the FaaS Type A functions as a service 124a,b is implemented on separate platform instantiations such that the multiple ones of the FaaS Type A functions as a service 124a,b can handle ones of the service requests 104 in the queues 108a,b having service identifiers 0x24. By implementing multiple instances of the FaaS Type A functions as a service 124a,b, such multiple instances can be used to handle larger volumes of corresponding ones of the service requests 104. In addition, such strategy of implementing multiple instances of the same function as a service across multiple resources can be used to increase the timeliness of handling large amounts of service requests 104 directed to the same function as a service.

In the illustrated example of FIG. 1, a first AFaaS Type V function as a service 132 and a second AFaaS Type V function as a service 134 are provided in the accelerator N resource(s) 118. The first AFaaS Type V function as a service 132 is identified by service identifier 0x54, and the second AFaaS Type V function as a service 134 is identified by service identifier 0x56. In the illustrated example, although the first and second AFaaS Type V functions as a service 132, 134 are the same type of AFaaS function as a service, they are identified using different service identifiers. In this manner, a service request 104 may include a service type identifier and/or a service identifier. In some examples, a client device 105 may include a service type identifier in a service request 104 to specify that the service request 104 can be handled by any instance of that type of AFaaS function as a service. In some examples, a client device 105 may include a service identifier in a service request 104 (e.g., the service identifier 0x54 of the first AFaaS Type V function as a service 132, or the service identifier 0x56 of the second AFaaS Type V function as a service 134) to specify a particular instance of the type of AFaaS function as a service to handle the service request 104. Although only two functions as a service are shown in each of the resources 116a,b, 118, fewer or more functions as a service may be provided.

Unlike prior techniques that push scheduled requests for functions as a service (e.g., service requests) to resources, examples disclosed herein enable other HQMs to pull scheduled service requests 104 from the queues 108a,b. To communicate the service requests 104 to other HQMs, the edge gateway 102 of the illustrated example includes an example HQM communication interface 136 to send those ones of the service requests 104 from one or more of the queues 108a,b of the edge gateway 102 to one or more other edge gateways, one or more physical racks, and/or one or more drawers (e.g., in response to pull requests from the one or more other edge gateways, one or more physical racks, and/or one or more drawers). In this manner, ones of the service requests 104 directed to functions as a service available via other edge gateways can be scheduled at the one or more other edge gateways by corresponding gateway-level HQMs and ones of the service requests 104 directed to functions as a service provided by resources in one or more physical racks in communication with the edge gateway 102 can be scheduled at the one or more physical racks by corresponding rack-level HQMs (e.g., the rack-level HQM 202 of FIG. 2A) and corresponding drawer-level HQMs (e.g., the drawer-level HQMs 206a,b of FIG. 2B). In the illustrated example, the HQM communication interface 136 is implemented outside the gateway-level HQM 106. In other examples such as shown in FIG. 2A, the HQM communication interface 136 is implemented in the gateway-level HQM 106.

In examples disclosed herein, gateway-level HQMs, rack-level HQMs, and drawer-level HQMs are configured to be aware of or to identify the functions as a service that are offered by resources in their corresponding physical racks (e.g., based on service type identifiers and/or service identifiers). Based on such service offering configurations, peer gateway-level HQMs, the rack-level HQMs, and the drawer-level HQMs pull corresponding ones of the service requests 104 from gateway-level HQMs. For example, rack-level HQMs and drawer-level HQMs pull service requests 104 from the queues 108a,b corresponding to the gateway-level HQM 106 via the HQM communication interface 136. In addition, peer gateway-level HQMs of other edge gateways that are in communication with the edge gateway 102 may pull service requests 104 from the queues 108a,b. In the illustrated example of FIG. 1, an HQM corresponding to the platform 1 resource(s) 116a sends an example pull request 142 based on a service type identifier (e.g., PullRequest (FaaSType=D)) to the gateway-level HQM 106 via the HQM communication interface 136 to pull one or more of the service requests 104 having service type identifier(s) matching the service type identifier "D" in the pull request 142. An HQM corresponding to the platform N resource(s) 116b sends an example pull request 144 based on service identifier (e.g., PullRequest(Service=0x21)) to the gateway-level HQM 106 via the HQM communication interface 136 to pull one or more of the service requests 104 having service identifier(s) matching the service identifier "0x21" in the pull request 144. An HQM corresponding to the accelerator N resource(s) 118 sends an example pull request 146 based on a service type identifier (e.g., PullRequest (AFaaSType=V)) to the gateway-level HQM 106 via the HQM communication interface 136 to pull one or more of the service requests 104 having service type identifier(s) matching the service type identifier "V" in the pull request 146.

In examples disclosed herein, results of computations or processes corresponding to the requested functions as a service are transferred from bottom-level HQMs to top-level HQMs. For example, drawer-level HQMs transfer results up to rack-level HQMs, and the rack-level HQMs transfer the results up to the gateway level HQM 106. The gateway-level HQM 106 sends the results to client devices 105 from which corresponding ones of the service requests 104 were received.

Figure 2A:
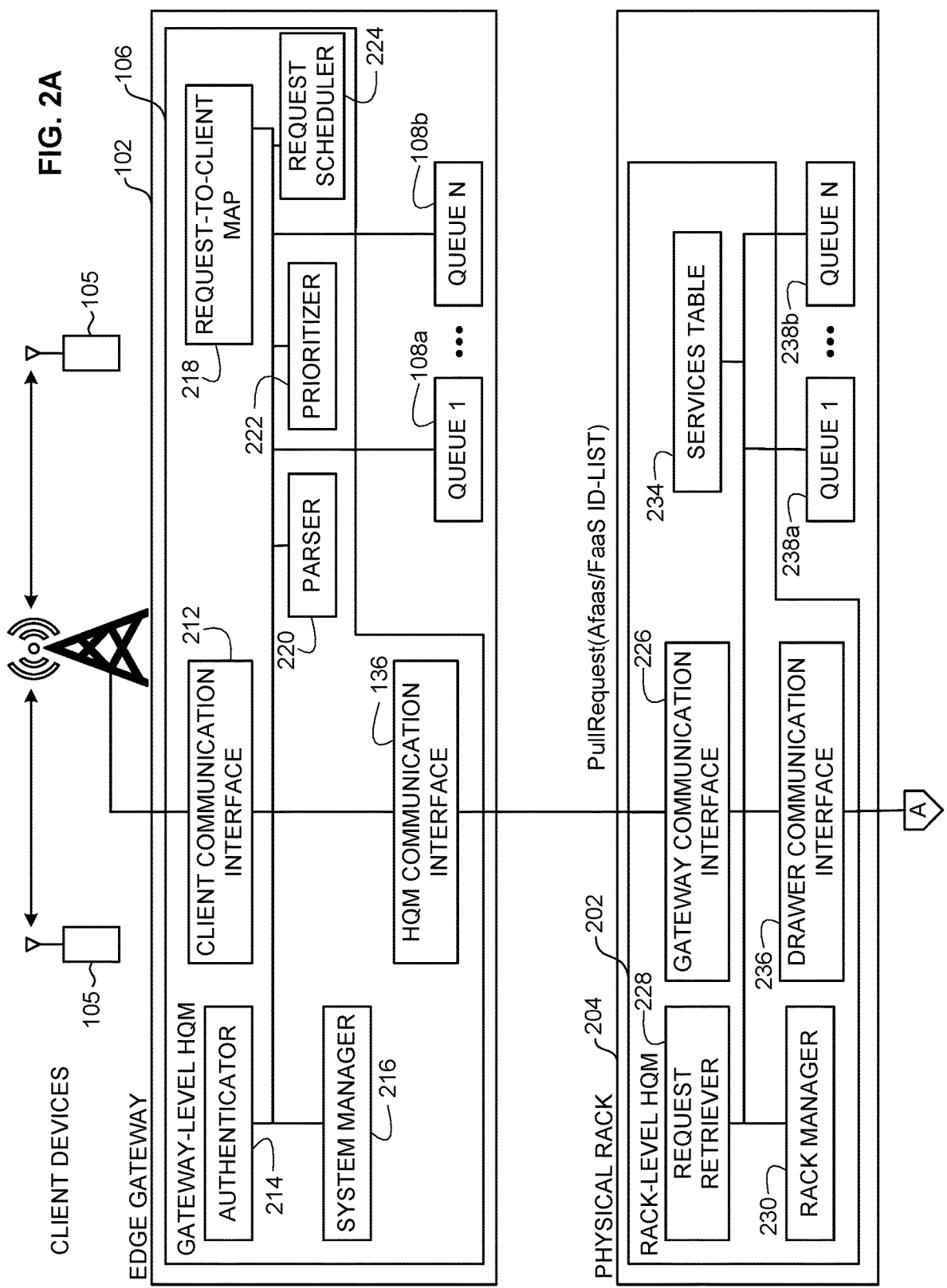
FIGS. 2A and 2B illustrate example hardware queue managers of the example edge gateway of FIG. 1, an example physical rack, and example drawers to handle service requests received from client devices based on scheduling of the service requests by the hardware queue managers.
Figure 2B:
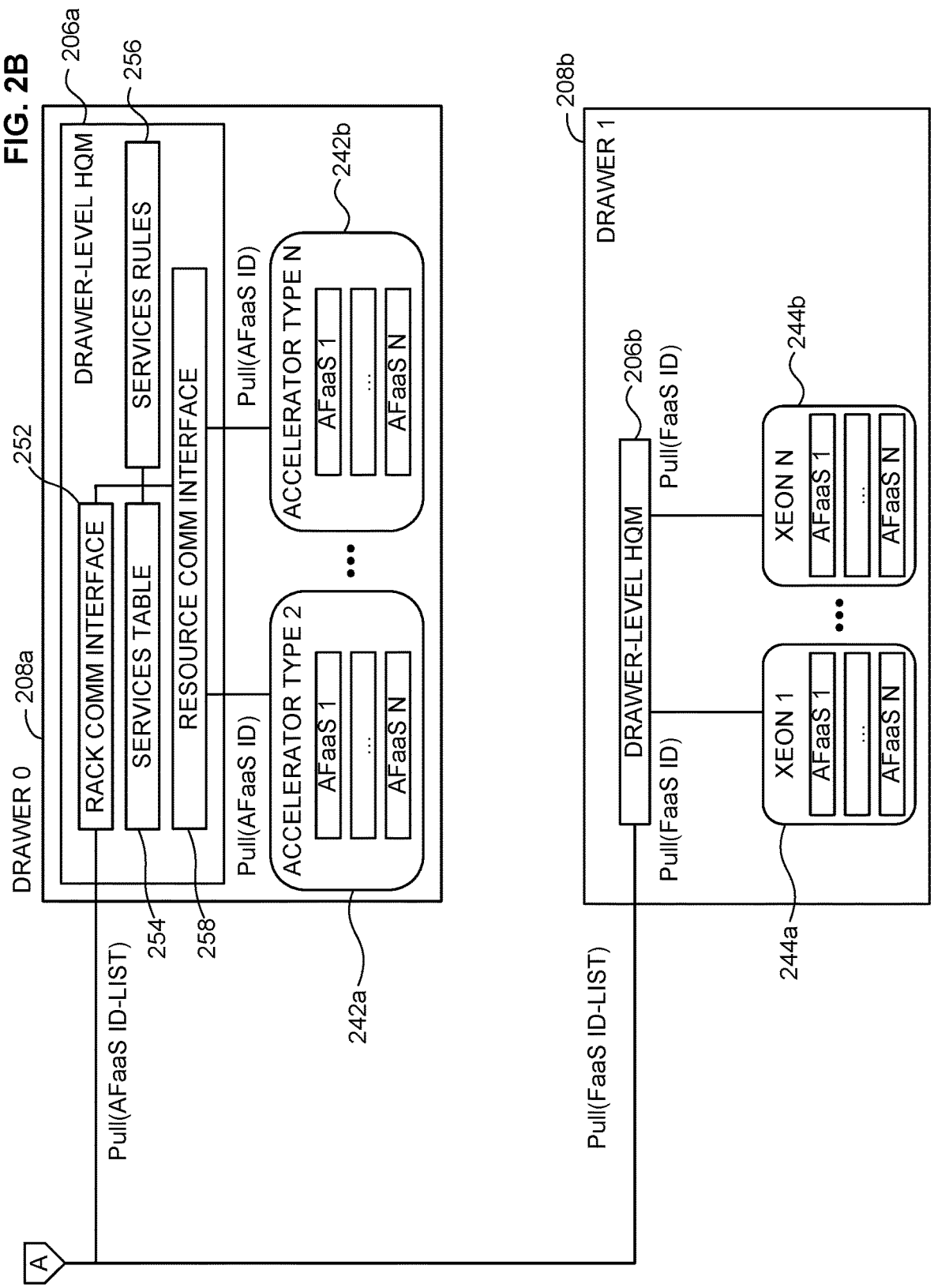

FIGS. 2A and 2B illustrate the example gateway-level HQM 106 of the edge gateway 102 of FIG. 1, an example rack-level HQM 202 of a physical rack 204, and example drawer-level HQMs 206a,b of drawers 208a,b of the physical rack 204 to handle service requests 104 (FIG. 1) received from the client devices 105 based on scheduling of the service requests 104 in the HQMs 106, 202, 206a,b. The example gateway-level HQM 106 includes an example client communication interface 212, an example authenticator 214, an example system manager 216, an example request-to-client map 218, an example parser 220, an example prioritizer 222, and an example request scheduler 224. Also in the illustrated example of FIGS. 2A and 2B, the gateway-level HQM 106 includes the HQM communication interface 136. The example rack-level HQM 202 includes an example gateway communication interface 226, an example request retriever 228, an example rack manager 230, an example services table 234, and an example drawer communication interface 236. In the illustrated example of FIGS. 2A and 2B, the rack-level HQM 202 is in circuit with example queues 238a,b. Although only two queues 238a,b are shown, any number of queues may be provided in circuit with the rack-level HQM 202. In addition, although only one physical rack 204 and two drawers 208a,b are shown, any number of physical racks and corresponding rack-level HQMs and any number of drawers and corresponding drawer-level HQMs may be provided in communication with the edge gateway 102. Such physical racks and corresponding rack-level HQMs and such drawers and corresponding drawer-level HQMs may be configured in substantially the same way as disclosed herein in connection with the rack-level HQM 202 and the drawer-level HQMs 206a,b.

The gateway-level HQM 106 is provided with the example client communication interface 212 to collect the service requests 104 received from various client devices 105. The example client communication interface 212 includes one or more input/output memory buffers to collect the service requests 104 from the client devices 105 and/or to store corresponding results for sending to the client devices 105. In the illustrated example, the client communication interface 212 may also include a transmitter and receiver (e.g., an Ethernet network interface card (NIC) interface) for receiving service requests 104 from the client devices 105 and sending the results to the client devices 105.

The gateway-level HQM 106 is provided with the example authenticator 214 to perform authentication and policy cross-checking of service requests 104 to determine which service requests 104 to accept. For example, the authenticator 214 may authenticate service requests 104 using digital certificates and or other authentication information (e.g., device identifiers, user credentials, etc.) to determine whether service requests 104 are valid. The example authenticator 214 may perform policy cross-checking of the service requests 104 by confirming that service requests 104 comply with system policies. For example, policies may be created to define what functions as a service are available, what client devices may access functions as a service, when functions as a service may be accessed, when client devices have exhausted maximum limits for service requests 104 for functions as a service, etc. The example authenticator 214 sends authenticated ones of the service requests 104 to the queues 108a,b. The queues 108a,b store the service requests 104 so that they can be pulled by lower-level HQMs such as the rack-level HQM 202 and the drawer-level HQMs 206a,b and/or by other gateway-level HQMs of edge gateways that are in communication with the edge gateway 102.

The gateway-level HQM 106 is provided with the example system manager 216 to configure priority rules for the service requests 104, configure availabilities of functions as a service offered by physical racks (e.g., the physical rack 204) in communication with the edge gateway 102, and control load balancing of service requests 104 across HQMs that pull the service requests 104 from the gateway-level HQM 106. The example system manager 216 can configure such features in the gateway-level HQM 106 and in other HQMs (e.g., the rack-level HQM 202 and the drawer-level HQMs 206a,b) that are in communication with the gateway-level HQM 106. For example, in the gateway-level HQM 106, the system manager 216 may provide priority rules to the prioritizer 222 for use by the prioritizer in assigning priorities to ones of the service requests 104. Example priority rules may be based on deadlines, round-trip latencies, service type identifiers, and/or service identifiers specified by client devices 105 in the service requests 104. For example, some priority rules may raise the priorities for service requests 104 having shorter round-trip latencies and/or with deadlines that will expire in shorter amounts of time than other service requests 104. Some example priority rules may specify higher priorities for some functions as a service based on service type identifier and/or service identifier. For example, functions as a service associated with autonomous self-driving cars may be assigned higher priorities than functions as a service for image storage or image processing applications due to autonomous self-driving cars needing faster results that affect the safety of human lives. Yet other example priority rules may assign higher priorities to service requests 104 from certain sources or locations (e.g., based on internet protocol (IP) address, media access control (MAC) addresses, international mobile equipment identity (IMEI), physical location coordinates, etc.). For example, service requests 104 from government devices, military devices, police devices, fire department devices, medical personnel devices and/or from locations experiencing emergency conditions may be assigned higher priorities than other service requests.

To configure availabilities of functions as a service offered by physical racks (e.g., the physical rack 204) in communication with the edge gateway 102, the example system manager 216 maintains a services list of service type identifiers and/or service identifiers indicative of functions as a service that are provided by resources in one or more physical racks in communication with the edge gateway 102. In addition, the system manager 216 programs service type identifiers and/or service identifiers in services tables of physical racks and/or drawers (e.g., the services table 234 of the physical rack 204 and/or the services table 254 of the drawer '0' 208a of FIG. 2B) to specify what functions as a service are provided by resources in those physical racks. When the example system manager 216 receives updates to its services list, it updates the services tables in physical racks based on changes to its services list so that the physical racks become aware in real time what functions as a service they provide. Updates to the services list of the system manager 216 can be made manually by system administrators and/or automatically by software-based agents as functions as a service are enabled or disabled for a number of reasons (e.g., new functions as a service are instantiated, functions as a service are taken offline for updating or fixing, some functions as a service are no longer offered, etc.).

To control load balancing of service requests 104 across multiple HQMs of physical racks that pull the service requests 104 from the gateway-level HQM 106, the example system manager 216 programs load-balancing rules that specify quantity-based and/or time-based limits into other HQMs. Such load-balancing rules may be used to control the number of and/or rate of service requests 104 pulled by the other HQMs. For example, the system manager 216 may program such load-balancing rules into rack-level HQMs of physical racks connected to the edge gateway 102 such as the rack-level HQM 202 of the physical rack 204. In this manner, service requests 104 specifying the same function as a service can be load balanced across multiple physical racks that provide that specified function as a service.

In some examples, load-balancing of the service requests 104 across multiple HQMs of physical racks may also be implemented by the system manager 216 based on assigning different functions as a service to different ones of the physical racks. For example, the system manager 216 may program HQMs of some physical racks to handle service requests 104 corresponding to functions as a service that typically have shorter deadlines and/or shorter round-trip latencies, and it may program HQMs of other physical racks to handle service requests 104 corresponding to functions as a service that typically have longer deadlines and/or longer round-trip latencies. In some examples, the system manager 216 may assign ones of the service requests 104 that are more urgent and/or higher priority to HQMs of physical racks having hardware acceleration resources that can perform functions as a service faster than software-based functions as a service.

To make changes in other HQMs to priority rules, services tables, load-balancing rules, the example system manager 216 is provided with a protocol to communicate with HQMs. The protocol specifies addresses of other HQMs for selectively communicating with individual ones of the HQMs and includes a broadcast mode for communicating with multiple HQMs simultaneously. In this manner, the system manager 216 can make changes to individual ones of the HQMs and/or make changes to multiple ones of the HQMs simultaneously.

The gateway-level HQM 106 is provided with the example request-to-client map 218 to map pending ones of the service requests 104 with identifiers (e.g., source IP addresses, MAC addresses, IMEI numbers, etc.) of corresponding client devices 105. In the illustrated example, pending ones of the service requests 104 are service requests 104 that are awaiting to be processed by functions as a service or are being processed by functions as a service and corresponding results have not yet been received at the gateway-level HQM 106. The example gateway-level HQM 106 uses the request-to-client map 218 to send results corresponding to the service requests 104 to corresponding client devices 105. For example, the client communication interface 212 may send results to IP addresses of client devices 105 identified in the request-to-client map 218 as corresponding to service requests 104 associated with the results.

The gateway-level HQM 106 is provided with the example parser 220 to parse the service requests 104 based on service parameters included in the service requests 104 by the client devices 105. The gateway-level HQM 106 is provided with the example prioritizer 222 to prioritize the service requests 104 based on the parsing performed by the parser 220. For example, if the parser 220 parses the service requests based on deadlines and/or round-trip latencies, the prioritizer 222 prioritizes ones of the service requests 104 with shorter round-trip latencies and/or with deadlines that will expire in shorter amounts of time as higher priority than ones of the service requests 104 with less stringent deadlines and/or round-trip latencies. For examples in which the parser 220 parses the service requests 104 based on service type identifiers and/or service identifiers, the prioritizer 222 may assign a higher priority to ones of the service requests 104 directed to functions as a service that the system manager 216 has identified as higher priority than others of the functions as a service. The example prioritizer 222 may additionally or alternatively prioritize the service requests 104 based on any other type of quality of service metric and/or maximum cost metric. For example, the prioritizer 222 may assign a higher priority to service requests 104 specifying a maximum cost that satisfies a quality of service threshold or cost threshold. In some examples, the prioritizer 222 may additionally or alternatively prioritize the service requests 104 based on tenant ID and/or service provider ID. For example, the prioritizer 222 may use tenant IDs to identify subscribers of functions as a service at different quality of service levels (e.g., high-tier preferred service subscriptions, mid-tier performance-balanced service subscriptions, and low-tier economy service subscriptions, etc.) and may prioritize the service requests 104 based on such levels. Similarly, the prioritizer 222 may use service provider IDs to identify different quality of service levels guaranteed by different service providers and may prioritize service requests 104 corresponding to those service providers based on such levels. In any case, the prioritizer 222 can be configured to prioritize the service requests 104 in any desired manner by providing different policy rules to the prioritizer 222.

The gateway-level HQM 106 is provided with the example request scheduler 224 to schedule the service requests 104 in the queues 108a,b based on priorities assigned by the prioritizer 222. In this manner, when pull requests (e.g., the pull requests 142, 144, 146 of FIG. 1) are received at the HQM communication interface 136 from other HQMs, the HQM communication interface 136 pulls higher-priority ones of the service requests 104 having higher ones of the assigned priorities from the queues 108a,b for sending to the requesting HQMs before sending lower-priority ones of the services requests 104.

The rack-level HQM 202 is provided with the example gateway communication interface 226 to communicate with the gateway-level HQM 106. For example, the gateway communication interface 226 sends pull requests to the HQM communication interface 136 of the gateway-level HQM 106 to pull or retrieve service requests 104 from the queues 108a,b. In addition, the example gateway communication interface 226 provides results to the gateway-level HQM 106. For example, when a function as a service of the physical rack 204 generates a result for a corresponding one of the service requests 104, the gateway communication interface 226 sends the result to the gateway-level HQM 106 so that the gateway-level HQM 106 can send the result to a corresponding client device 105.

In addition, the gateway communication interface 226 receives configuration information provided by the system manager 216 of the gateway-level HQM 106. For example, the gateway communication interface 226 may receive service type identifiers and/or service identifiers indicative of functions as a service provided by resources of the physical rack 204. The gateway communication interface 226 sends such service type identifiers and/or service identifiers to the services table 234 for storing in the services table 234 so that the rack-level HQM 202 is aware of the functions as a service provided by its resources.

The rack-level HQM 202 is provided with the example request retriever 228 to generate pull requests for use in pulling or retrieving service requests 104 from the gateway-level HQM 106. For example, when drawer-level resources of the physical rack 204 are available to provide functions as a service and or when space is available in the queues 238a,b for additional service requests 104, the request retriever 228 can generate one or more pull requests to retrieve one or more service requests 104 from the gateway-level HQM 106. In the illustrated example, the request retriever 228 generates pull requests based on service type identifiers and/or service identifiers that are stored in the services table 234 by including the service type identifiers and/or service identifiers in pull requests to specify what service requests 104 to be pulled from the gateway-level HQM 106. In the illustrated example of FIG. 2A, the request retriever 228 generates a pull request that is shown as "PullRequest (AFaaS/FaaS ID-LIST)" sent by the gateway communication interface 226 of the rack-level HQM 202 to the HQM communication interface 136 of the gateway-level HQM 106. The pull request "PullRequest(AFaaS/FaaS ID-LIST)" of the illustrated example is structured to include a list (e.g. ID-LIST) of service type identifiers and/or service identifiers specifying types of functions as a service or specific functions as a service for which service requests 104 should be pulled from the queues 108a,b of the gateway-level HQM 106.

After receiving service requests 104 from the gateway-level HQM 106, the example request retriever 228 can store the service requests 104 in ones of the queues 238a,b. In this manner, the example drawer-level HQMs 206a,b can pull the service requests 104 from the queues 238a,b to perform the functions as a service specified in the service requests 104.

The rack-level HQM 202 is provided with the example rack manager 230 to manage different aspects of the rack-level HQM 202. For example, a plurality of physical racks in addition to the physical rack 204 shown in FIG. 2A may be in communication with the edge gateway 102. In some examples, multiple ones of the physical racks may offer the same functions as a service. Such redundant functions as a service across multiple physical racks may be used to load balance ones of the service requests 104 specifying the same function as a service by distributing those service requests 104 across different ones of the physical racks. To accomplish such load-balancing, the example rack manager 230 can be configured by the system manager 216 of the gateway-level HQM 106 with load-balancing rules that limit the number of service requests that the rack-level HQM 202 can pull from the gateway-level HQM 106, as discussed above. Similarly, rack managers of rack-level HQMs in other physical racks connected to the edge gateway 102 may also be configured with similar load-balancing rules. For example, the rack manager 230 may enforce a service request limit specifying that the request retriever 228 can pull up to a maximum quantity of service requests 104 in a single pull request or in successive pull requests. Additionally or alternatively, the rack manager 230 may enforce a service request limit specifying that the request retriever 228 can pull a single service request 104 or a maximum quantity of service requests 104 within a specified time period.

In some examples, different ones of physical racks connected to the edge gateway 102 may be assigned to perform different functions as a service based on, for example, different resources of the physical racks and/or the need to perform some functions as a service on some physical racks faster than other functions as a service on other physical racks. In such examples, the rack manager 230 may be programmed to control what service requests 104 may be pulled by the request retriever 228 from the gateway-level HQM 106 based on functions as a service specified in the services table 234 as being provided by the physical rack 204.

The rack-level HQM 202 is provided with the example drawer communication interface 236 to receive pull requests from the drawer-level HQMs 206*a,b* and send service requests 104 from the queues 238*a,b* to the drawer-level HQMs 206*a,b* in response to the pull requests. In addition, when drawer-level resources perform the functions as a service specified in the service requests 104 and generate corresponding results, the drawer communication interface 236 receives the results from the drawer-level HQMs 206*a, b*. The example drawer communication interface 236 sends the results to the gateway communication interface 226 so that the results can be communicated up to the gateway-level HQM 106 and out to the corresponding client devices 105.

In the illustrated example of FIGS. 2A and 2B, the drawer communication interface 236 receives pull requests shown in FIG. 2B as a "Pull(AFaaS ID-LIST)" from the drawer-level HQM 206*a* and a "Pull(FaaS ID-LIST)" from the drawer-level HQM 206*b*. The pull requests "Pull(AFaaS ID-LIST)" and "Pull(FaaS ID-LIST)" of the illustrated example are structured to include lists (e.g., ID-LIST) of service type identifiers and/or service identifiers to specify multiple service requests 104 to be pulled from the queues 238*a,b* of the rack-level HQM 202.

As shown in the example of FIG. 2B, the drawer '0' 208*a* is provided with example resources 242*a,b* in circuit with the drawer-level HQM 206*a*, and the drawer '1' 208*b* is provided with example resources 244*a,b* in circuit with the drawer-level HQM 206*b*. The example resources 242*a,b* of the drawer '0' 208*a* are accelerator type resources (e.g., similar or substantially identical to the accelerator N resources 118 of FIG. 1) that process service requests 104 corresponding to functions as a service implemented by hardware acceleration resources. The example resources 244*a,b* of the drawer '1' 208*b* are platform type resources (e.g., Xeon platforms) (e.g., similar or substantially identical to the platform resources 116*a,b* of FIG. 1) corresponding to functions as a service implemented by software-based resources. In the illustrated example, the drawer-level HQM 206*a* provides service requests 104 retrieved from the queue(s) 238*a,b* of the rack-level HQM 202 to the accelerator type resources 242*a,b*. Also in the illustrated example, the drawer-level HQM 206*b* provides service requests 104 retrieved from the queue(s) 238*a,b* of the rack-level HQM 202 to the platform type resources 244*a,b*. In this manner, accelerator type resources 242*a,b* of the drawer '0' 208*a* can pull service requests 104 from the drawer-level HQM 206*a* when available to perform functions as a service specified in those service requests 104. Similarly, the platform type resources 244*a,b* of the drawer '1' 208*b* can pull service requests 104 from the drawer-level HQM 206*b* when available to perform functions as a service specified in those service requests 104. In the illustrated example, the accelerator type resources 242*a,b* and the platform type resources 244*a,b* include corresponding queues to store service requests 104 for which the accelerator type resources 242*a,b* and the platform type resources 244*a,b* will perform functions as a service. When their service requests 104 in their corresponding queues fall below a threshold, the accelerator type resources 242*a,b* and the platform type resources 244*a,b* send pull requests to the corresponding drawer-level HQMs 206*a,b* to retrieve more service requests from the rack-level HQM 202.

In the illustrated example of FIG. 2B, the drawer-level HQM 206*a* is shown with a number of components that include an example rack communication interface 252, an example services table 254, an example services rules table 256, and an example resource communication interface 258. Although not shown, the example drawer-level HQM 206*b* of the drawer '1' 208*b* also includes similar components as those shown in the drawer-level HQM 206*a* of the drawer '0' 208*a*.

The drawer-level HQM 206*a* is provided with the example rack communication interface 252 to communicate with the rack-level HQM 202. For example, the rack communication interface 252 sends pull requests (e.g., Pull (AFaaS ID-LIST)) to the drawer communication interface 236 of the rack-level HQM 202 and receives corresponding service requests 104 from the drawer communication interface 236. In addition, the rack communication interface 252 sends results generated by the accelerator type resources 242*a,b* to the rack-level HQM 202 for corresponding service requests 104.

The drawer-level HQM 206*a* is provided with the example services table 254 to identify functions as a service provided by the accelerator type resources 242*a,b* of the drawer '0' 208*a*. The example services table 254 may be programmed with service type identifiers and/or service identifiers by the system manager 216 of the gateway-level HQM 106.

The drawer-level HQM 206*a* is provided with the example services rules table 256 to store policy rules indicative of types of service requests 104 to be pulled from the rack-level HQM 202 and indicative of prioritizations for processing those service requests 104 by the accelerator type resources 242*a,b*. For example, policy rules may specify that the drawer-level HQM 206*a* is to pull only ones of the service requests 104 from the rack-level HQM 202 that have particular deadlines and/or particular round-trip latencies. In addition, example policy rules may specify that ones of the service requests 104 having particular deadlines and/or particular round-trip latencies are to be prioritized higher than other ones of the service requests 104. As such, when the rack communication interface 252 receives multiple service requests 104 from the rack-level HQM 202, the drawer-level HQM 206*a* may perform priority-based scheduling of the service requests 104 based on the policy rules in the services rules table 256. In some examples, the services rules table 256 also stores load-balancing rules to load balance service requests 104 across multiple resources of the drawer '0' 208*a* that provide the same functions as a service.

The drawer-level HQM 206*a* is provided with the example resource communication interface 258 to receive pull requests from the accelerator type resources 242*a,b* and send corresponding service requests 104 to the accelerator type resources 242*a,b* in response to the pull requests. In the illustrated example of FIG. 2B, the accelerator type resources 242*a,b* send pull requests (e.g., Pull(AFaaS ID)) to the drawer-level HQM 206*a* when the accelerator type resources 242*a,b* are ready to service additional service requests 104. (Similarly, the example platform type resources 244a,b send pull requests (e.g., Pull(FaaS ID)) to the drawer-level HQM 206b when the platform type resources 244a,b are ready to service additional service requests 104.) The example resource communication interface 258 also receives results from the accelerator type resources 242a,b corresponding to ones of the service requests 104 serviced by the accelerator type resources 242a,b. For example, the accelerator type resources 242a,b may push generated results to the resource communication interface 258 so that the rack communication interface 252 can send them up to the rack-level HQM 202.

Figure 3:
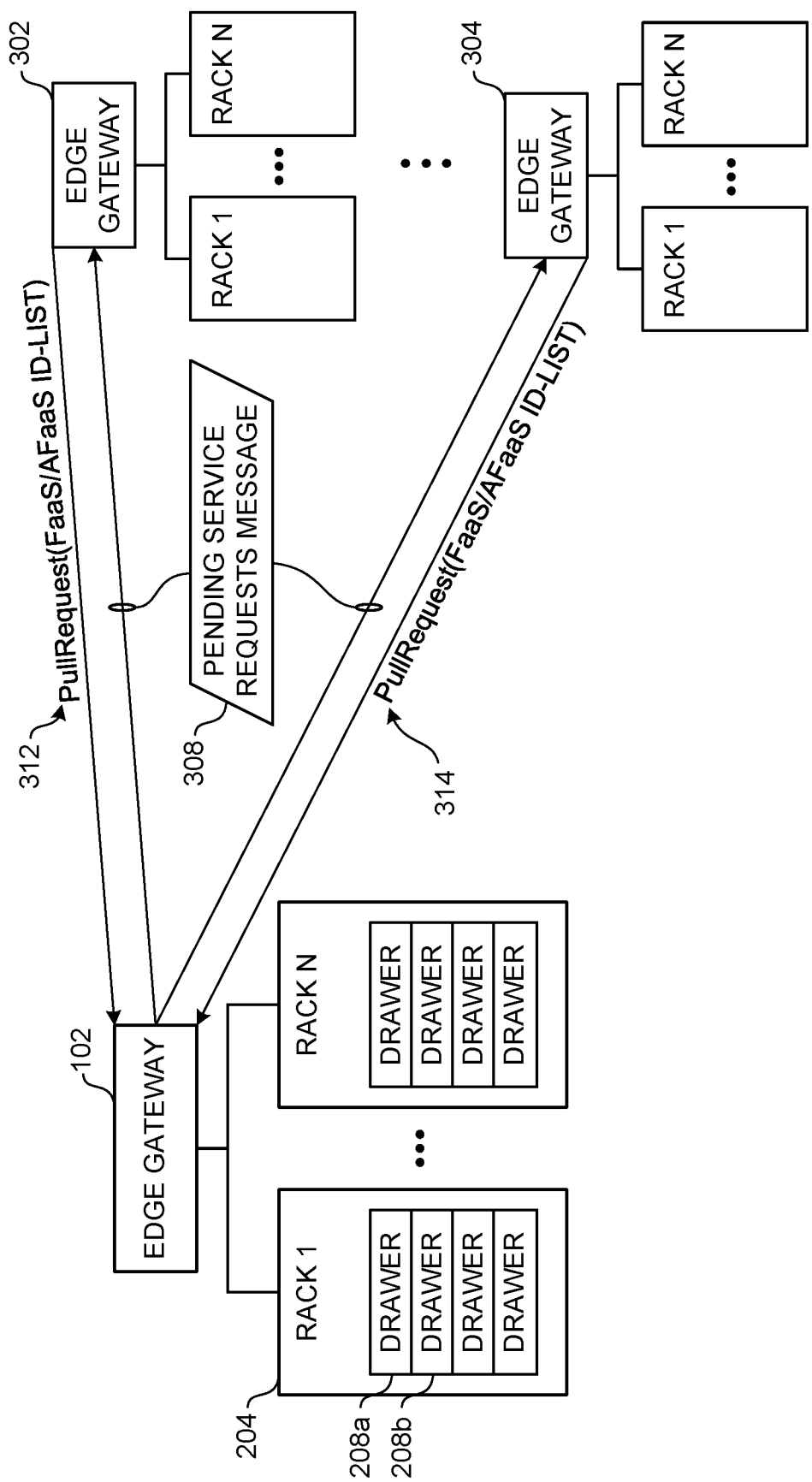
FIG. 3 illustrates example peer edge gateways in communication with the edge gateway of FIGS. 1 and 2A to perform load balancing of service requests at the gateway level.

FIG. 3 illustrates example peer edge gateways 302, 304 in communication with the edge gateway 102 of FIGS. 1 and 2A to perform load balancing of service requests 104 (FIG. 1) at the gateway level. In the illustrated example, the edge gateway 102 is shown in communication with a plurality of physical racks having corresponding drawers of resources, which includes the physical rack 204 of FIG. 2A and the drawers 208a,b of FIG. 2B. The example peer edge gateways 302, 304 are also in communication with corresponding physical racks having corresponding drawers of resources that provide functions as a service. The example peer edge gateways 302, 304 and their corresponding physical racks and drawers include HQMs configured substantially similar or identical to the gateway-level HQM 106, the rack-level HQM 202, and the drawer-level HQMs 206a,b of FIGS. 1, 2A, and 2B. As such, the peer edge gateways 302, 304 and their corresponding physical racks and drawers schedule and process service requests 104 in a similar manner as described above in connection with FIGS. 1, 2A, and 2B. The edge gateways 102, 302, 304 may communicate with one another via Ethernet connections, via the Internet, and/or via any other networking interface.

In the illustrated example of FIG. 3, the edge gateways 102, 302, 304 perform load balancing of the service requests 104 to more quickly and more efficiently perform functions as a service. To perform such load balancing, the edge gateways 102, 302, 304 communicate with one another to make one another aware of how many service requests 104 are awaiting to be handled in their corresponding queues (e.g., the queues 108a,b of FIGS. 1 and 2A). In this manner, when one of the edge gateways 102, 302, 304 has capacity or availability to handle service requests 104, that one of the edge gateways 102, 302, 304 can pull service requests 104 from one or more other ones of the edge gateways 102, 302, 304.

In the illustrated example of FIG. 3, periodically (e.g., every N units of time) or aperiodically (e.g., event driven based on quantity of pending service requests 104, based on availability of resources, etc.) the edge gateway 102 sends a pending service requests message 308 including a 'pending service request quantity' indicative of the quantity of service requests 104 that are scheduled in the queues 108a,b of the edge gateway 102. For example, the gateway-level HQM 106 (FIGS. 1 and 2A) may use its HQM communication interface 136 (FIGS. 1 and 2A) to send the pending service requests message 308 to gateway-level HQMs of the peer edge gateways 302, 304 using broadcast, multicast, and/or unicast transmission modes. In some examples, the system manager 216 of the gateway-level HQM 106 generates the pending service requests messages 308 to include service parameters corresponding to the pending service requests 104. In the illustrated example, the peer edge gateways 302, 304 send pull requests 312, 314 (e.g., PullRequest(FaaS/AFaaS ID-LIST)) to the gateway-level HQM 106 of the edge gateway 102 to pull or retrieve ones of the service requests 104 that can be handled by functions as a services provided by resources in the physical racks of the edge gateways 302, 304. For example, the pull requests 312, 314 include lists (e.g. ID-LIST) of service type identifiers and/or service identifiers specifying types of functions as a service or specific functions as a service for which service requests 104 should be pulled from the queues 108a,b of the gateway-level HQM 106. In some examples, the peer edge gateways 302, 304 are configured to send the pull requests 312, 314 to the edge gateway 102 based on when numbers of service requests in their queues decrease to satisfy a minimum queue threshold. That is, when the numbers of service requests are at or below the minimum queue threshold, the gateway-level HQMs of the peer edge gateways 302, 304 are triggered to send the pull requests 312, 313 to the edge gateway 102. In response, the gateway-level HQM 106 sends service requests 104 corresponding to the service type identifiers and/or service identifiers of the pull requests 312, 314 to the edge gateways 302, 304.

The example peer edge gateways 302, 304 may also send pending service requests messages 308 to each other and to the edge gateway 102 so that similar transfers of service requests 104 can be made between any of the edge gateways 102, 302, 304. In this manner, load balancing of the service requests 104 across the edge gateways 102, 302, 304 can be used to provide higher quality of service to client devices 105 pertaining to functions as a service, and resources associated with the different peer edge gateways 102, 302, 304 can be used more efficiently.

While an example manners of implementing the gateway-level HQM 106, the rack-level HQM 202, and the drawer-level HQMs 206a,b are illustrated in FIGS. 2A and 2B, one or more of the elements, processes and/or devices illustrated in FIGS. 2A and 2B may be combined, divided, re-arranged, omitted, eliminated and/or implemented in any other way. Further, the example client communication interface 212, the example authenticator 214, the example system manager 216, the example request-to-client map 218, the example parser 220, the example prioritizer 222, the example request scheduler 224, the example HQM communication interface 136, the example gateway communication interface 226, the example request retriever 228, the example rack manager 230, the example services table 234, the example drawer communication interface 236, the example rack communication interface 252, the example services table 254, the example services rules table 256, the example resource communication interface 258 and/or, more generally, the example gateway-level HQM 106, the example rack-level HQM 202, and the example drawer-level HQMs 206a,b of FIGS. 1, 2A, and 2B may be implemented by hardware, software, firmware and/or any combination of hardware, software and/or firmware. Thus, for example, any of the example client communication interface 212, the example authenticator 214, the example system manager 216, the example request-to-client map 218, the example parser 220, the example prioritizer 222, the example request scheduler 224, the example HQM communication interface 136, the example gateway communication interface 226, the example request retriever 228, the example rack manager 230, the example services table 234, the example drawer communication interface 236, the example rack communication interface 252, the example services table 254, the example services rules table 256, the example resource communication interface 258 and/or, more generally, the example gateway-level HQM 106, the example rack-level HQM 202, and the example drawer-level HQMs 206a,b could be implemented by one or more analog or digital circuit(s), logic circuits, programmable processor(s), programmable controller(s), graphics processing unit(s) (GPU(s)), digital signal processor(s) (DSP(s)), application specific integrated circuit (s) (ASIC(s)), field programmable gate array(s) (FPGA(s)), programmable logic device(s) (PLD(s)) and/or field programmable logic device(s) (FPLD(s)). When reading any of the apparatus or system claims of this patent to cover a purely software and/or firmware implementation, at least one of the example client communication interface 212, the example authenticator 214, the example system manager 216, the example request-to-client map 218, the example parser 220, the example prioritizer 222, the example request scheduler 224, the example HQM communication interface 136, the example gateway communication interface 226, the example request retriever 228, the example rack manager 230, the example services table 234, the example drawer communication interface 236, the example rack communication interface 252, the example services table 254, the example services rules table 256, the example resource communication interface 258 and/or, more generally, the example gateway-level HQM 106, the example rack-level HQM 202, and the example drawer-level HQMs 206a,b is/are hereby expressly defined to include a non-transitory computer readable storage device or storage disk such as a memory, a digital versatile disk (DVD), a compact disk (CD), a Blu-ray disk, etc. including the software and/or firmware. Further still, the example gateway-level HQM 106, the example rack-level HQM 202, and the example drawer-level HQMs 206a,b may include one or more elements, processes and/or devices in addition to, or instead of, those illustrated in FIGS. 1, 2A, and 2B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In examples disclosed herein, means for scheduling the service requests 104 may be implemented by the request scheduler 224. In examples disclosed herein, means for sending pull requests to the gateway-level HQM 106 may be implemented by the gateway communication interface 226. In examples disclosed herein, means for sending pull requests to the rack-level HQM 202 may be implemented by the rack communication interface 252. In examples disclosed herein, means for sending the pending service requests message 308 to a peer edge gateway 302, 304 may be implemented by the HQM communication interface 136. In examples disclosed herein, means for sending the service requests 104 to a peer edge gateway 302, 304 may be implemented by the HQM communication interface 136. In examples disclosed herein, means for assigning priorities to the service requests 104 may be implemented by the prioritizer 222. In examples disclosed herein, means for mapping the service requests 104 to corresponding ones of the client devices 105 may be implemented by the request-to-client map 218. In examples disclosed herein, means for sending results generated by functions as a service to the client devices 105 may be implemented by the client communication interface 212. In examples disclosed herein, means for storing at least one of a service type identifier or a service identifier in the services table 234 of the rack-level HQM 202 and/or in the services table 254 of the drawer-level HQM 206a may be implemented by the system manager 216. In examples disclosed herein, means for receiving pull requests at the drawer-level HQM 206a,b from corresponding resources 242a,b, 244a,b of the drawer 208a,b to retrieve the service requests 104 may be implemented by the resource communication interface 258. In examples disclosed herein, means for sending the service requests 104 from the drawer-level HQM 206a,b to corresponding resources 242a,b, 244a,b of the drawers 208a,b may be implemented by the resource communication interface 258. In examples disclosed herein, means for storing policy rules indicative of types of service requests to be pulled from the rack-level HQM 202 by the drawer-level HQM 206a,b may be implemented by the services rules table 256. In examples disclosed herein, means for storing policy rules indicative of priorities for processing the service requests 104 may be implemented by the services rules table 256.

In examples disclosed herein, means for parsing service requests 104 may be implemented by the parser 220. In examples disclosed herein, means for sending service requests 104 to the rack-level HQM 202 may be implemented by the HQM communication interface 136. In examples disclosed herein, means for receiving pull requests from the rack-level HQM 202 may be implemented by the HQM communication interface 136. In examples disclosed herein, means for programming at least one of service type identifiers, service identifiers, or policy rules in the rack-level HQM 202 and/or the drawer-level HQM 206a may be implemented by the system manager 216.

In examples disclosed herein, means for authenticating service requests 104 may be implemented by the authenticator 214. In examples disclosed herein, means for generating and/or providing pull requests for pulling or retrieving service requests from the gateway-level HQM 106 may be implemented by the request retriever 228. In examples disclosed herein, the drawer communication interface 236 of the rack-level HQM 202 may implement means for receiving pull requests from the drawer-level HQM 206a,b and/or means for sending service requests 104 to the drawer-level HQM 206a,b. In examples disclosed herein, the rack manager 230 may implement means for storing load-balancing rules, means for enforcing service request limits, and means for controlling what service requests 104 may be pulled from the gateway-level HQM 106. In examples disclosed herein, the queues 108a,b, 238a,b may implement means for storing service requests 104. In examples disclosed herein, means for executing or implementing functions as a service may be implemented by the resources 242a,b, 244a,b of the drawers 208a,b.

Figure 4:
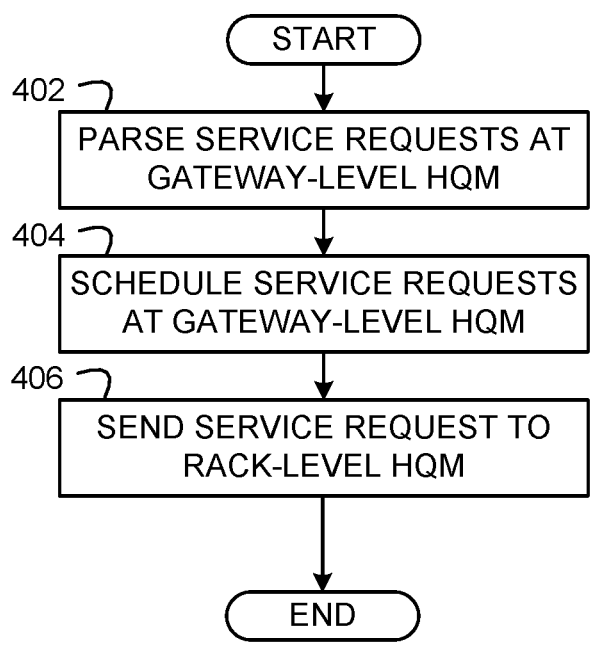
FIG. 4 depicts a flowchart representative of example computer readable instructions that may be executed to implement the example gateway-level hardware queue manager of FIGS. 1 and 2A to schedule service requests in accordance with teachings of this disclosure.
Figure 5A:
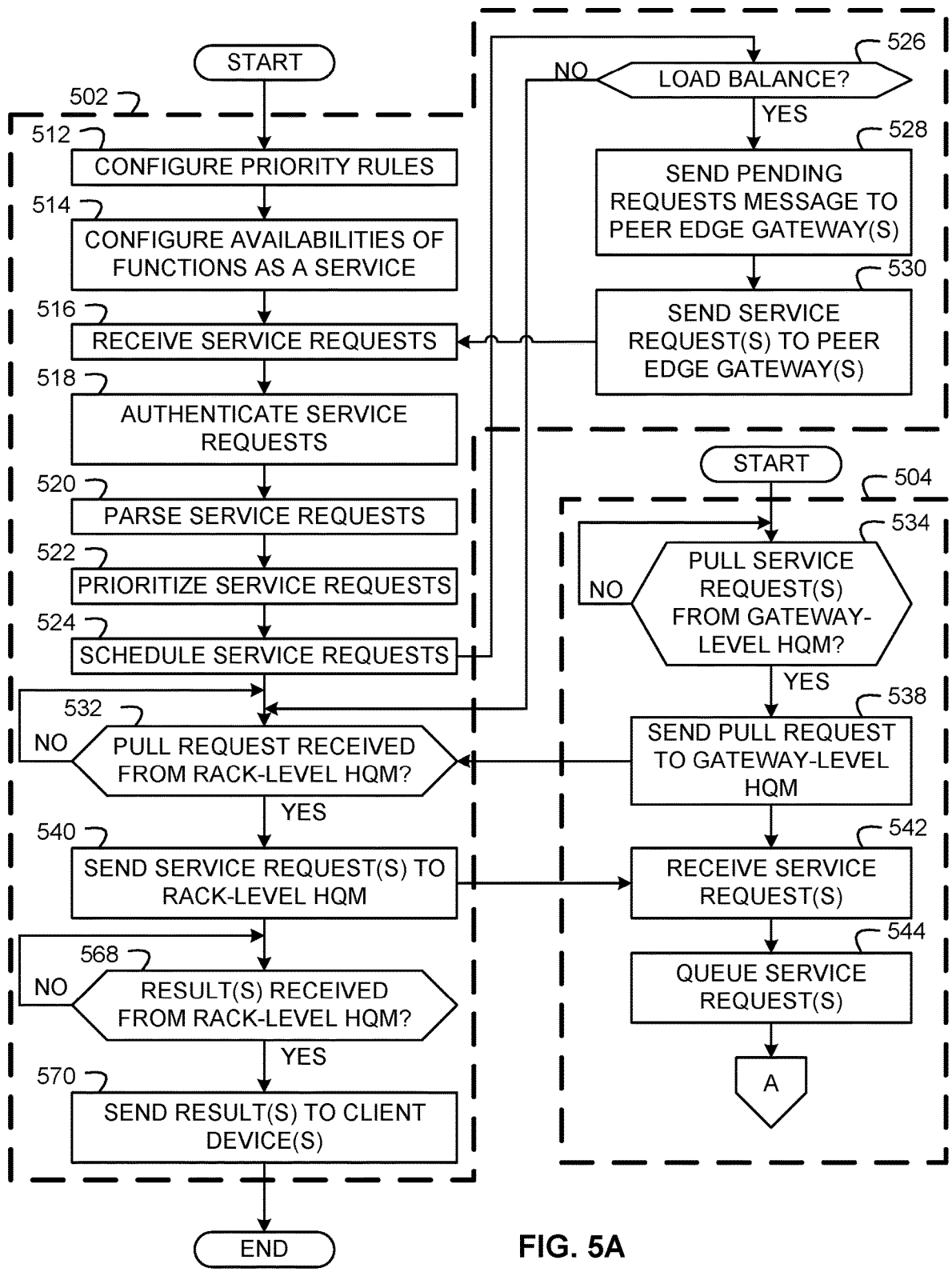
FIGS. 5A and 5B depict flowcharts representative of example computer readable instructions that may be executed to implement the example hardware queue managers of FIGS. 1, 2A, and 2B to schedule service requests in accordance with teachings of this disclosure.
Figure 5B:
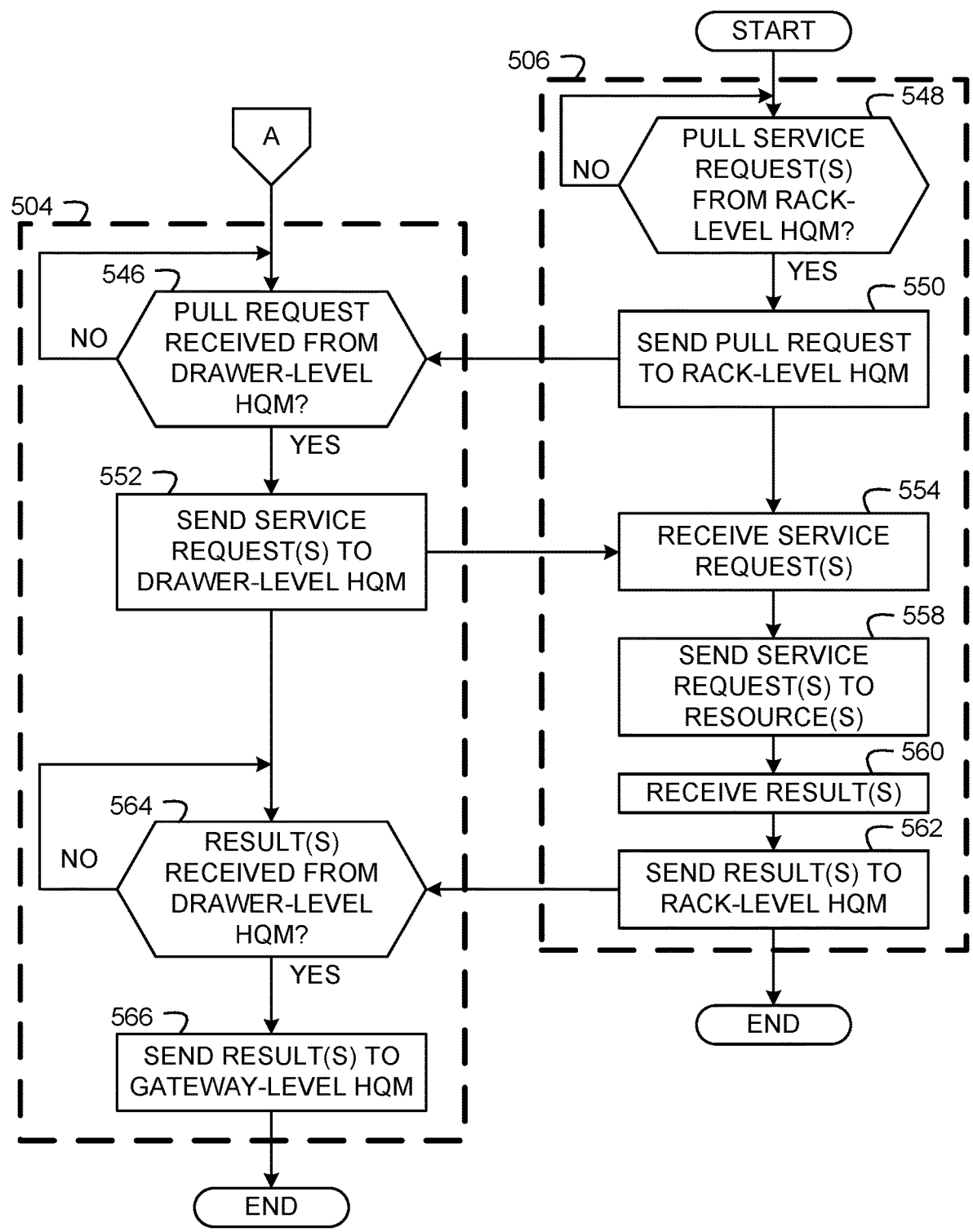

Flowcharts representative of example hardware logic or machine readable instructions for implementing the example gateway-level HQM 106, the example rack-level HQM 202, and/or the example drawer-level HQMs 206a,b are shown in FIGS. 4, 5A, and 5B. The machine readable instructions may be one or more programs or portion(s) of one or more programs for execution by a processor such as the processor 612 shown in the example processor platform 600 discussed below in connection with FIG. 6. The program(s) may be embodied in software stored on a non-transitory computer readable storage medium such as a CD-ROM, a floppy disk, a hard drive, a DVD, a Blu-ray disk, or a memory associated with the processor 612, but the entirety of the program(s) and/or parts thereof could alternatively be executed by a device other than the processor 612 and/or embodied in firmware or dedicated hardware. Further, although the example program(s) is/are described with reference to the flowcharts illustrated in FIGS. 4, 5A, and 5B, many other methods of implementing the example gateway-level HQM 106, the example rack-level HQM 202, and the example drawer-level HQMs 206a,b may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4, 5A, and 5B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 4 depicts a flowchart representative of example computer readable instructions that may be executed to implement the example gateway-level HQM 106 of FIGS. 1, 2A, and 2B to schedule service requests 104 (FIG. 1) in accordance with teachings of this disclosure. The example process of FIG. 4 begins at block 402 at which the example gateway-level HQM 106 parses the service requests 104 based on service parameters in the service requests 104. The example gateway-level HQM 106 schedules the service requests 104 in a queue 108a,b (FIGS. 1 and 2A) based on the service parameters (block 404). The example HQM communication interface 136 (FIGS. 1 and 2A) sends ones of the service requests 104 from the queue 108a,b to the rack-level HQM 202 (FIG. 2A) of the physical rack 204 (FIG. 2A) in circuit with the edge gateway 102 (FIGS. 1 and 2A) (block 406). For example, the HQM communication interface 136 sends the ones of the service requests 104 corresponding to functions as a service provided by resources in the physical rack 204. The example process of FIG. 4 then ends.

FIGS. 5A and 5B depict flowcharts representative of example computer readable instructions that may be executed to implement the example gateway-level HQM 106 (FIGS. 1 and 2A), the example rack-level HQM 202 (FIGS. 1 and 2A), and the example drawer-level HQMs 206a,b (FIG. 2B) to schedule service requests 104 for functions as a service. The example flowcharts of FIGS. 5A and 5B include an example gateway-level HQM process 502 (FIG. 5A), an example rack-level HQM process 504 (FIGS. 5A and 5B), and an example drawer-level HQM process 506 (FIG. 5B). The gateway-level HQM process 502 is performed by the example gateway-level HQM 106. The example rack-level HQM process 504 is performed by the rack-level HQM 202. The example drawer-level HQM process 506 is performed by the drawer-level HQM 206a. However, the drawer-level HQM 206b may also perform the drawer-level HQM process 506.

The example gateway-level HQM process 502 begins at block 512 at which the system manager 216 (FIG. 2A) configures priority rules. For example, the system manager 216 may program priority rules in the prioritizer 222 (FIG. 2A) of the gateway-level HQM 106 and/or in the rack manager 230 (FIG. 2A) of the rack-level HQM 202. The example system manager 216 configures availabilities of functions as a service (block 514). For example, the system manager 216 stores service type identifiers and/or service identifiers in the services table 234 of the rack-level HQM 202 and/or in the services table 254 of the drawer-level HQM 206a. The example client communication interface 212 (FIG. 2A) receives service requests 104 (block 516). For example, the client communication interface 212 receives the service requests 104 from the client devices 105 (FIGS. 1 and 2A). The example authenticator 214 (FIG. 2A) authenticates the service requests 104 (block 518). The example parser 220 (FIG. 2A) parses the service requests 104 (block 520). For example, the parser 220 parses the service requests 104 based on service parameters in the service requests 104. The example prioritizer 222 (FIG. 2A) prioritizes the service requests 104 (block 522). For example, the prioritizer 222 prioritizes the service requests 104 based on the service parameters. The gateway-level HQM 106 schedules the service requests 104 (block 524). For example, the request scheduler 224 (FIG. 2A) of the gateway-level HQM 106 schedules the service requests 104 in one or more of the queues 108a,b based on the priority levels assigned to the service requests 104 by the prioritizer 222. In some examples, the request scheduler 224 also maps pending ones of the service requests 104 with identifiers of corresponding ones of the client devices 105 in the request-to-client map 218 so that subsequently generated results can be sent to the corresponding ones of the client devices 105.

In the illustrated example, control advances to block 526 at which the gateway-level HQM 106 determines whether to perform load-balancing. For example, the system manager 216 of the gateway-level HQM 106 may determine that the quantity of service requests 104 in the queues 108a,b satisfies a threshold quantity indicative of when to offload or transfer ones of the service requests 104 to other peer edge gateways such as, for example, the peer edge gateways 302, 304 of FIG. 3. When the gateway-level HQM 106 determines at block 526 that it should perform load-balancing, the HQM communication interface 136 (FIGS. 1 and 2A) sends the example pending service requests message 308 (FIG. 3) from the edge gateway 102 to one or more peer edge gateways 302, 304 (block 528). The HQM communication interface 136 sends one or more of the service request(s) 104 to the one or more peer edge gateway(s) 302, 304 in response to one or more pull request(s) 312, 314 from the peer edge gateway(s) 302, 304 (block 530). The example pull request(s) 312, 314 from the peer edge gateway(s) 302, 304 is/are responsive to the pending service requests message 308 sent by the HQM communication interface 136. In the illustrated example, following block 530 control returns to block 516 to receive additional service requests 104 from the client devices 105. However, control may advance to any other suitable operation. Also in the illustrated example, when the gateway-level HQM 106 determines at block 526 not to perform load-balancing, control advances to block 532. However, control may advance to any other suitable operation.

At block 532, the HQM communication interface 136 determines whether a pull request has been received from the rack-level HQM 202. For example, the rack-level HQM process 504 may be executing in parallel to process service requests 104 at the rack-level HQM 202. Turning to the example rack-level HQM process 504, at block 534 the rack manager 230 (FIG. 2A) determines whether to pull one or more service request(s) 104 from the gateway-level HQM 106. For example, the rack manager 230 may determine at block 534 to pull service request(s) 104 from the gateway-level HQM 106 when the quantity of service requests 104 in the queues 238a,b of the physical rack 204 are below a threshold. When the rack manager 230 determines at block 534 to pull one or more service request(s) 104 from the gateway-level HQM 106, the rack-level HQM 202 sends a pull request to the gateway-level HQM 106 (block 538) for one or more service requests 104. For example, the example request retriever 228 (FIG. 2A) generates the pull request, and the gateway communication interface 226 (FIG. 2A) of the rack-level HQM 202 sends the pull request to the HQM interface 136 of the gateway-level HQM 106. In some examples, the request retriever 228 generates the pull request based on policies or rules enforced by the rack manager 230 (FIG. 2A).

Returning to the example gateway-level HQM process 502, when the HQM communication interface 136 determines at block 532 that it has received the pull request from the rack-level HQM 202, control advances to block 540. At block 540, the gateway-level HQM 106 sends one or more service requests 104 to the rack-level HQM 202. For example, the HQM communication interface 136 of the gateway-level HQM 106 sends one or more of the service requests 104 from the queues 108a,b to the gateway communication interface 226 of the rack-level HQM 202 in response to the pull request received at block 532.

Returning to the rack-level HQM process 504, the rack-level HQM 202 receives the service request(s) 104 (block 542) from the gateway-level HQM 106. The example request retriever 228 queues or stores the service request(s) 104 (block 544) in one or more of the queues 238a,b of the physical rack 204. Control then advances to block 546 of the rack-level HQM process 504 shown in FIG. 5B. At block 546, the drawer communication interface 236 (FIG. 2A) of the rack-level HQM 202 determines whether a pull request has been received from the drawer-level HQM 206a (FIG. 2B). For example, the drawer-level HQM process 506 may be executing in parallel to process service requests 104 at the drawer-level HQM 206a. Turning to the example drawer-level HQM process 506, at block 548 the drawer-level HQM 206a determines whether to pull one or more service request(s) 104 from the rack-level HQM 202. For example, the drawer-level HQM 206a may determine at block 548 to pull service request(s) 104 from the rack-level HQM 202 when it receives one or more pull requests from one or more resources of the drawer '0' 208a (FIG. 2B) (e.g., the accelerator type resources 242a,b of FIG. 2B). When the drawer-level HQM 206a determines at block 548 to pull one or more service request(s) 104 from the rack-level HQM 202, the drawer-level HQM 206a sends a pull request to the rack-level HQM 202 (block 550) for one or more service requests 104. For example, the rack communication interface 252 of the drawer-level HQM 206a sends the pull request to the drawer communication interface 236 of the rack-level HQM 202.

Returning to the example rack-level HQM process 504, when the drawer communication interface 236 determines at block 546 that it has received the pull request from the drawer-level HQM 206a, control advances to block 552. At block 552, the rack-level HQM 202 sends one or more service requests 104 to the drawer-level HQM 206a. For example, the drawer communication interface 236 of the rack-level HQM 202 sends one or more of the service requests 104 from the queues 238a,b to the rack communication interface 252 of the drawer-level HQM 206a in response to the pull request received at block 546.

Returning to the drawer-level HQM process 506, the drawer-level HQM 206a receives the service request(s) 104 (block 554) from the rack-level HQM 202 via the rack communication interface 252. The drawer-level HQM 206a sends the service request(s) 104 to one or more resources of the drawer '0' 208a (block 558). For example, the resource communication interface 258 of the drawer-level HQM 206a sends the service request(s) 104 to one or more of the accelerator type resources 242a,b in response to receiving one or more pull requests from the accelerator type resources 242a,b.

After the resource(s) of the drawer '0' 208a perform(s) one or more functions as a service for one or more of the service request(s) 104, the drawer-level HQM 206a receives one or more corresponding results from the resources (block 560). For example, the resource communication interface 258 of the drawer-level HQM 206a receives one of more result(s) from the accelerator type resource(s) 242a,b. The drawer-level HQM 206a sends the result(s) to the rack-level HQM 202 (block 562). For example, the rack communication interface 252 of the drawer-level HQM 206a sends the result(s) to the drawer communication interface 236 of the rack-level HQM 202.

Returning to the example rack-level HQM process 504, at block 564 when the drawer communication interface 236 of the rack-level HQM 202 determines that it has received the result(s) from the drawer-level HQM 206a, control advances to block 566. At block 566, the rack-level HQM 202 sends the result(s) to the gateway-level HQM 106. For example, the gateway communication interface 226 of the rack-level HQM 202 sends the result(s) to the HQM communication interface 136 of the gateway-level HQM 106.

Returning to the example gateway-level HQM process 502 of FIG. 5A, at block 568 when the HQM communication interface 136 of the gateway-level HQM 106 determines that it has received the result(s) from the rack-level HQM 202, control advances to block 570. At block 570, the client communication interface 212 sends the result(s) to corresponding ones of the client device(s) 105. For example, the client communication interface 212 may use the request-to-client map 218 (FIG. 2A) of the gateway-level HQM 106 to identify ones of the client devices 105 corresponding to the result(s), and send the result(s) to the identified client device(s) 105. The example processes 502, 504, 506 of FIGS. 5A and 5B end.

Figure 6:
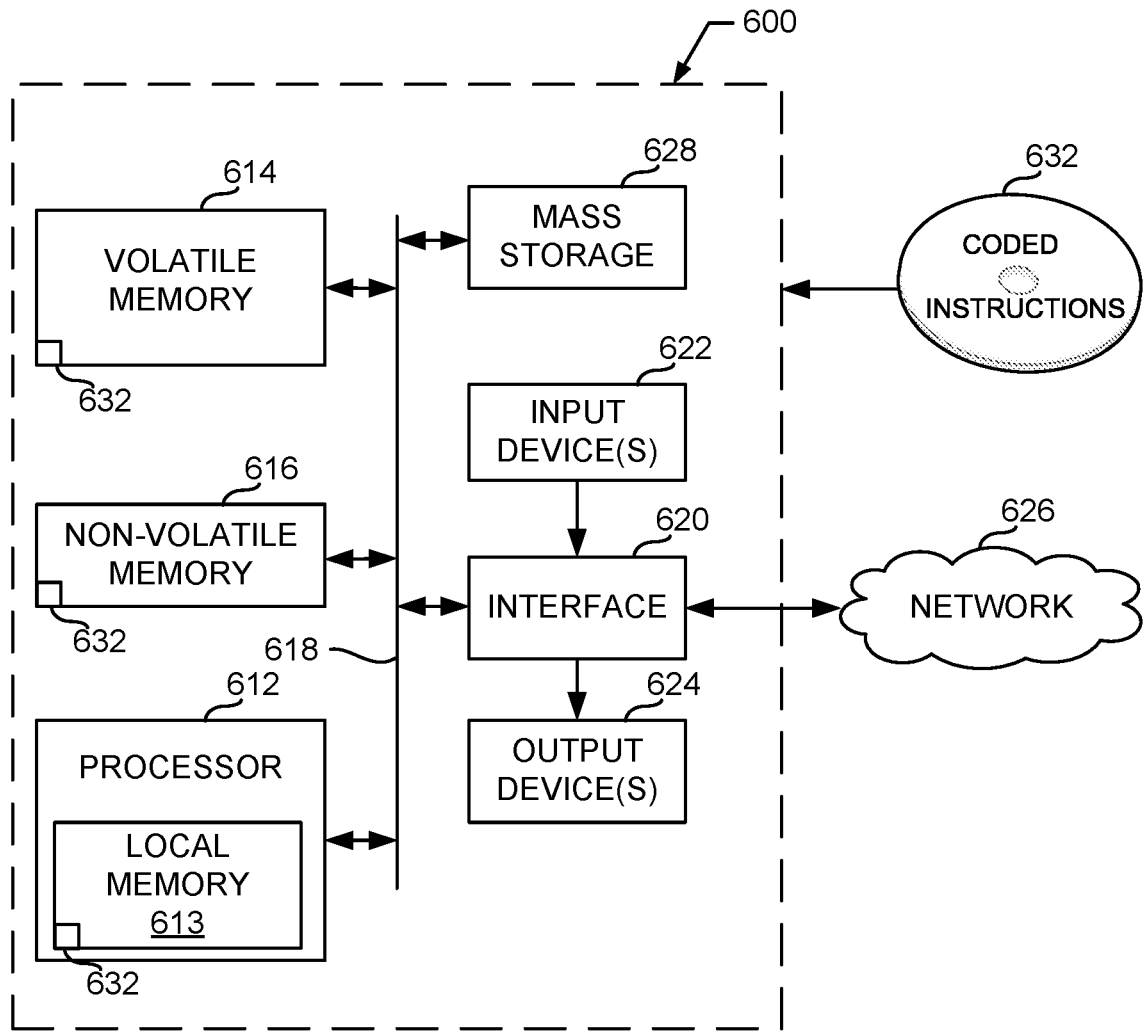
FIG. 6 is a block diagram of an example processing platform structured to execute the instructions of FIGS. 4, 5A, and/or 5B to implement the example hardware queue managers of FIGS. 1, 2A, and/or 2B to schedule service requests in accordance with teachings of this disclosure.

FIG. 6 is a block diagram of an example processor platform 600 structured to execute the instructions of FIGS. 4, 5A, and/or 5B to implement the example gateway-level HQM 106 (FIGS. 1 and 2A), the example rack-level HQM 202 (FIG. 2A), and/or the example drawer-level HQM(s) 206a,b (FIG. 2B). The processor platform 600 can be, for example, an edge gateway, a spine switch, a top-of-rack (ToR) switch, a server, a computer, a workstation, or any other type of computing device suitable for implementing the HQMs 106, 202, 206a,b.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor 612 may be a semiconductor based (e.g., silicon based) device.

The processor 612 of the illustrated example includes a local memory 613 (e.g., a cache, static random access memory (SRAM), etc.). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

Machine executable instructions 632 to implement the example processes 502, 504, 506 of FIGS. 5A and 5B may be stored in the mass storage device 628, in the volatile memory 614, in the non-volatile memory 616, and/or on a removable non-transitory computer readable storage medium such as a CD or DVD.

In examples in which the processor platform 600 implements the gateway-level HQM 106 (FIGS. 1 and 2A), the processor 612 implements the authenticator 214, the system manager 216, the parser 220, the prioritizer 222, and the request scheduler 224 of FIG. 2A. In addition, the interface 620 implements the client communication interface 212 (FIG. 2A) and the HQM communication interface 136 (FIGS. 1 and 2A). In addition, the queues 108a,b (FIGS. 1 and 2A) and the request-to-client map 218 (FIG. 2A) may be implemented by one or more of the local memory 613, the volatile memory 614, and/or the non-volatile memory 616.

In examples in which the processor platform 600 implements the rack-level HQM 202 (FIG. 2A), the processor 612 implements the request retriever 228 and the rack manager 230 of FIG. 2A, the interface 620 implements the gateway communication interface 226 and the drawer communication interface of FIG. 2A, and the services table 234 and/or the queues 238a,b of FIG. 2A may be implemented by one or more of the local memory 613, the volatile memory 614, and/or the non-volatile memory 616.

In examples in which the processor platform 600 implements the drawer-level HQM 206a, the interface 620 implements the rack communication interface 252 and the resource communication interface 258 of FIG. 2B, and the services table and the services rules table 256 may be implemented by one or more of the local memory 613, the volatile memory 614, and/or the non-volatile memory 616.

The following pertain to further examples disclosed herein.

Example 1 is a system to schedule service requests in a network computing system using hardware queue managers. The system of Example 1 includes: a gateway-level hardware queue manager in an edge gateway to schedule the service requests received from client devices in a queue; a rack-level hardware queue manager in a physical rack in communication with the edge gateway, the rack-level hardware queue manager to send a pull request to the gateway-level hardware queue manager for a first one of the service requests; and a drawer-level hardware queue manager in a drawer of the physical rack, the drawer-level hardware queue manager to send a second pull request to the rack-level hardware queue manager for the first one of the service requests, the drawer including a resource to provide a function as a service specified in the first one of the service requests.

In Example 2, the subject matter of Example 1 can optionally include a hardware queue manager communication interface in the gateway-level hardware queue manager, the hardware queue manager communication interface to: send a pending service requests message from the edge gateway to a peer edge gateway, the pending service requests message indicative of a quantity of the service requests scheduled in the queue; and send a second one of the service requests to the peer edge gateway in response to a pull request from the peer edge gateway, the pull request from the peer edge gateway being responsive to the pending service requests message.

In Example 3, the subject matter of any one of Examples 1-2 can optionally include that the service requests include at least one of deadlines, round-trip latencies, service type identifiers, or service identifiers, and can optionally include a prioritizer in the gateway-level hardware queue manager to assign priorities to the service requests based on the at least one of the deadlines, the round-trip latencies, the service type identifiers, or the service identifiers.

In Example 4, the subject matter of any one of Examples 1-3 can optionally include a request-to-client map in the gateway-level hardware queue manager to map pending ones of the service requests with identifiers of corresponding ones of the client devices.

In Example 5, the subject matter of any one of Examples 1~4 can optionally include a client communication interface in the gateway-level hardware queue manager to send a result generated by the function as a service specified in the first one of the service requests to a corresponding one of the client devices based on the request-to-client map.

In Example 6, the subject matter of any one of Examples 1-5 can optionally include a first services table in the rack-level hardware queue manager; a second services table in the drawer-level hardware queue manager; and a system manager in the gateway-level hardware queue manager, the system manager to store at least one of a service type identifier or a service identifier in the first and second services tables indicative of the function as a service provided by the resource of the drawer.

In Example 7, the subject matter of any one of Examples 1-6 can optionally include a resource communication interface in the drawer-level hardware queue manager to receive a third pull request from the resource to retrieve the first one of the service requests.

In Example 8, the subject matter of any one of Examples 1-7 can optionally include a services rules table in the drawer-level hardware queue manager to store a first policy rule indicative of a type of a function as a service for which a service request is to be pulled from the rack-level hardware queue manager and a second policy rule indicative of a priority for processing the first one of the service requests.

Example 9 is a system to schedule service requests in a network computing system using hardware queue managers. The system of Example 9 includes: means for scheduling the service requests received from client devices in a queue of an edge gateway; means for sending a pull request from a physical rack to a gateway-level hardware queue manager for a first one of the service requests; and means for sending a second pull request from a drawer of the physical rack to a rack-level hardware queue manager of the physical rack for the first one of the service requests, the drawer including a resource to provide a function as a service specified in the first one of the service requests.

In Example 10, the subject matter of Example 9 can optionally include means for sending a pending service requests message from the edge gateway to a peer edge gateway, the pending service requests message indicative of a quantity of the service requests scheduled in the queue, and the means for sending the pending service requests message to send a second one of the service requests to the peer edge gateway in response to a pull request from the peer edge gateway, the pull request from the peer edge gateway being responsive to the pending service requests message.

In Example 11, the subject matter of any one of Examples 9-10 can optionally include that the service requests include at least one of deadlines, round-trip latencies, service type identifiers, or service identifiers, and further including means for assigning priorities to the service requests based on the at least one of the deadlines, the round-trip latencies, the service type identifiers, or the service identifiers.

In Example 12, the subject matter of any one of Examples 9-11 can optionally include means for mapping pending ones of the service requests with identifiers of corresponding ones of the client devices.

In Example 13, the subject matter of any one of Examples 9-12 can optionally include means for sending a result generated by the function as a service specified in the first one of the service requests to a corresponding one of the client devices based on the mapping of the pending ones of the service requests with the identifiers of the corresponding ones of the client devices.

In Example 14, the subject matter of any one of Examples 9-13 can optionally include means for storing at least one of a service type identifier or a service identifier in a first services table in the rack-level hardware queue manager and in a second services table in the drawer, the at least one of the service type identifier or the service identifier indicative of the function as a service provided by the resource of the drawer.

In Example 15, the subject matter of any one of Examples 9-14 can optionally include means for receiving a third pull request from the resource to retrieve the first one of the service requests.

In Example 16, the subject matter of any one of Examples 9-15 can optionally include means for storing a first policy rule indicative of a type of a function as a service for which a service request is to be pulled from the rack-level hardware queue manager and a second policy rule indicative of a priority for processing the first one of the service requests.

Example 17 is a non-transitory computer readable storage medium comprising instructions that, when executed, cause at least one processor to at least: schedule service requests received from client devices in a queue of an edge gateway; send a pull request from a physical rack to a gateway-level hardware queue manager for a first one of the service requests; and send a second pull request from a drawer of the physical rack to a rack-level hardware queue manager of the physical rack for the first one of the service requests, the drawer including a resource to provide a function as a service specified in the first one of the service requests.

In Example 18, the subject matter of Example 17 can optionally include that the instructions further cause the at least one processor to: send a pending service requests message from the edge gateway to a peer edge gateway, the pending service requests message indicative of a quantity of the service requests scheduled in the queue; and send a second one of the service requests to the peer edge gateway in response to a pull request from the peer edge gateway, the pull request from the peer edge gateway being responsive to the pending service requests message.

In Example 19, the subject matter of any one of Examples 17-18 can optionally include that the service requests include at least one of deadlines, round-trip latencies, service type identifiers, or service identifiers, and that the instructions further cause the at least one processor to assign priorities to the service requests based on the at least one of the deadlines, the round-trip latencies, the service type identifiers, or the service identifiers.

In Example 20, the subject matter of any one of Examples 17-19 can optionally include that the instructions are further to cause the at least one processor to map pending ones of the service requests with identifiers of corresponding ones of the client devices in a request-to-client map of the gateway-level hardware queue manager.

In Example 21, the subject matter of any one of Examples 17-20 can optionally include that the instructions are further to cause the at least one processor to send a result generated by the function as a service specified in the first one of the service requests to a corresponding one of the client devices based on the request-to-client map.

In Example 22, the subject matter of any one of Examples 17-21 can optionally include that the instructions are further to cause the at least one processor to store at least one of a service type identifier or a service identifier in a first services table in the rack-level hardware queue manager and in a second services table in the drawer, the at least one of the service type identifier or the service identifier indicative of the function as a service provided by the resource of the drawer.

In Example 23, the subject matter of any one of Examples 17-22 can optionally include that the instructions are further to cause the at least one processor to receive a third pull request from the resource to retrieve the first one of the service requests.

In Example 24, the subject matter of any one of Examples 17-23 can optionally include that the instructions are further to cause the at least one processor to store a first policy rule in a services rules table, the first policy rule indicative of a type of a function as a service for which a service request is to be pulled from the rack-level hardware queue manager and a second policy rule indicative of a priority for processing the first one of the service requests.

Example 25 is a method to schedule service requests in a network computing system using hardware queue managers. The method of Example 25 includes: scheduling the service requests received from client devices in a queue of an edge gateway; sending a pull request from a physical rack to a gateway-level hardware queue manager for a first one of the service requests; and sending a second pull request from a drawer of the physical rack to a rack-level hardware queue manager of the physical rack for the first one of the service requests, the drawer including a resource to provide a function as a service specified in the first one of the service requests.

In Example 26, the subject matter of Example 25 can optionally include sending a pending service requests message from the edge gateway to a peer edge gateway, the pending service requests message indicative of a quantity of the service requests scheduled in the queue; and sending a second one of the service requests to the peer edge gateway in response to a pull request from the peer edge gateway, the pull request from the peer edge gateway being responsive to the pending service requests message.

In Example 27, the subject matter of any one of Examples 25-26 can optionally include that the service requests include at least one of deadlines, round-trip latencies, service type identifiers, or service identifiers, and can optionally include assigning priorities to the service requests based on the at least one of the deadlines, the round-trip latencies, the service type identifiers, or the service identifiers.

In Example 28, the subject matter of any one of Examples 25-27 can optionally include mapping pending ones of the service requests with identifiers of corresponding ones of the client devices.

In Example 29, the subject matter of any one of Examples 25-28 can optionally include sending a result generated by the function as a service specified in the first one of the service requests to a corresponding one of the client devices based on the mapping of the pending ones of the service requests with the identifiers of the corresponding ones of the client devices.

In Example 30, the subject matter of any one of Examples 25-29 can optionally include storing at least one of a service type identifier or a service identifier in a first services table in the rack-level hardware queue manager and in a second services table in the drawer, the at least one of the service type identifier or the service identifier indicative of the function as a service provided by the resource of the drawer.

In Example 31, the subject matter of any one of Examples 25-30 can optionally include receiving a third pull request from the resource to retrieve the first one of the service requests.

In Example 32, the subject matter of any one of Examples 25-31 can optionally include storing a first policy rule indicative of a type of a function as a service for which a service request is to be pulled from the rack-level hardware queue manager and a second policy rule indicative of a priority for processing the first one of the service requests.

Example 33 is an apparatus to schedule service requests in a network computing system using a hardware queue manager. The apparatus of Example 33 includes: a gateway-level hardware queue manager in an edge gateway, the gateway-level hardware queue manager to: parse the service requests based on service parameters in the service requests; and schedule the service requests in a queue based on the service parameters, the service requests received from client devices; and a hardware queue manager communication interface to send ones of the service requests from the queue to a rack-level hardware queue manager of a physical rack in circuit with the edge gateway, the ones of the service requests corresponding to functions as a service provided by resources in the physical rack.

In Example 34, the subject matter of Example 33 can optionally include a client communication interface to send to the client devices results corresponding to the service requests, the results generated by the functions as a service provided by the physical rack.

In Example 35, the subject matter of any one of Examples 33-34 can optionally include that the hardware queue manager communication interface is further to: receive a pull request from the rack-level hardware queue manager, the pull request including a first identifier; and provide one of the service requests to the rack-level hardware queue manager in response to the pull request when the first identifier corresponds to a second identifier of the one of the service requests, the first identifier being at least one of a service type identifier or a service identifier.

In Example 36, the subject matter of any one of Examples 33-35 can optionally include that the rack-level hardware queue manager is located at a top-of-rack switch of the physical rack.

In Example 37, the subject matter of any one of Examples 33-36 can optionally include that the service parameters include at least one of deadlines or round-trip latencies by which results of corresponding ones of the service requests are to be received at corresponding ones of the client devices, and optionally include a prioritizer to assign priorities to the service requests based on the at least one of the deadlines or the round-trip latencies.

In Example 38, the subject matter of any one of Examples 33-37 can optionally include that the gateway-level hardware queue manager is to schedule the service requests in the queue based on the assigned priorities of the service requests.

In Example 39, the subject matter of any one of Examples 33-38 can optionally include that the hardware queue manager communication interface is to send the ones of the service requests from the queue to the rack-level hardware queue manager based on the assigned priorities by first sending higher-priority ones of the service requests before sending lower-priority ones of the service requests.

In Example 40, the subject matter of any one of Examples 33-39 can optionally include a system manager to program the rack-level hardware queue manager of the physical rack with at least one of identifiers corresponding to the functions as a service provided by the physical rack or policy rules for prioritizing ones of the service requests in the physical rack.

Example 41 is an apparatus to schedule service requests in a network computing system using a hardware queue manager. The apparatus of Example 41 includes: means for parsing the service requests based on service parameters in the service requests, the service requests received at a gateway-level hardware queue manager in an edge gateway from client devices; means for scheduling the service requests in a queue based on the service parameters; and means for sending ones of the service requests from the queue to a rack-level hardware queue manager of a physical rack in circuit with the edge gateway, the ones of the service requests corresponding to functions as a service provided by resources in the physical rack.

In Example 42, the subject matter of Example 41 can optionally include means for sending results to the client devices, the results corresponding to the service requests and generated by the functions as a service provided by the physical rack.

In Example 43, the subject matter of any one of Examples 41-42 can optionally include that the means for sending the ones of the service requests is to: receive a pull request from the rack-level hardware queue manager, the pull request including a first identifier; and provide one of the service requests to the rack-level hardware queue manager in response to the pull request when the first identifier corresponds to a second identifier of the one of the service requests, the first identifier being at least one of a service type identifier or a service identifier.

In Example 44, the subject matter of any one of Examples 41-43 can optionally include the rack-level hardware queue manager is located at a top-of-rack switch of the physical rack.

In Example 45, the subject matter of any one of Examples 41-44 can optionally include that the service parameters include at least one of deadlines or round-trip latencies by which results of corresponding ones of the service requests are to be received at corresponding ones of the client devices, and optionally include means for assigning priorities to the service requests based on the at least one of the deadlines or the round-trip latencies.

In Example 46, the subject matter of any one of Examples 41-45 can optionally include that the means for scheduling the service requests in the queue schedules the service requests based on the assigned priorities of the service requests.

In Example 47, the subject matter of any one of Examples 41-46 can optionally include that the means for sending the ones of the service requests from the queue to the rack-level hardware queue manager sends the ones of the service requests based on the assigned priorities by first sending higher-priority ones of the service requests before sending lower-priority ones of the service requests.

In Example 48, the subject matter of any one of Examples 41-47 can optionally include means for programming the rack-level hardware queue manager of the physical rack with at least one of identifiers corresponding to the functions as a service provided by the physical rack or policy rules for prioritizing ones of the service requests in the physical rack.

Example 48 is a non-transitory computer readable storage medium comprising instructions that, when executed, cause at least one processor to at least: parse service requests based on service parameters in the service requests, the service requests received at a gateway-level hardware queue manager in an edge gateway from client devices; schedule the service requests in a queue based on the service parameters; and send ones of the service requests from the queue to a rack-level hardware queue manager of a physical rack in circuit with the edge gateway, the ones of the service requests corresponding to functions as a service provided by resources in the physical rack.

In Example 49, the subject matter of Example 48 can optionally include that the instructions are further to cause the at least one processor to send results to the client devices, the results corresponding to the service requests and generated by the functions as a service provided by the physical rack.

In Example 50, the subject matter of any one of Examples 48-49 can optionally include that the instructions are further to cause the at least one processor to: receive a pull request from the rack-level hardware queue manager, the pull request including a first identifier; and provide one of the service requests to the rack-level hardware queue manager in response to the pull request when the first identifier corresponds to a second identifier of the one of the service requests, the first identifier being at least one of a service type identifier or a service identifier.

In Example 51, the subject matter of any one of Examples 48-50 can optionally include that the rack-level hardware queue manager is located at a top-of-rack switch of the physical rack.

In Example 52, the subject matter of any one of Examples 48-51 can optionally include that the service parameters include at least one of deadlines or round-trip latencies by which results of corresponding ones of the service requests are to be received at corresponding ones of the client devices, and optionally include that the instructions are further to cause the at least one processor to assign priorities to the service requests based on the at least one of the deadlines or the round-trip latencies.

In Example 54, the subject matter of any one of Examples 48-52 can optionally include that the instructions are to cause the at least one processor to schedule the service requests in the queue based on the assigned priorities of the service requests.

In Example 55, the subject matter of any one of Examples 48-54 can optionally include that the instructions are to cause the at least one processor to send the ones of the service requests from the queue to the rack-level hardware queue manager based on the assigned priorities by first sending higher-priority ones of the service requests before sending lower-priority ones of the service requests.

In Example 56, the subject matter of any one of Examples 48-55 can optionally include that the instructions are to cause the at least one processor to program the rack-level hardware queue manager of the physical rack with at least one of identifiers corresponding to the functions as a service provided by the physical rack or policy rules for prioritizing ones of the service requests in the physical rack.

Example 57 is a method to schedule service requests in a network computing system using a hardware queue manager. The method of Example 57 includes: parsing the service requests based on service parameters in the service requests, the service requests received at a gateway-level hardware queue manager in an edge gateway from client devices; scheduling the service requests in a queue based on the service parameters; and sending ones of the service requests from the queue to a rack-level hardware queue manager of a physical rack in circuit with the edge gateway, the ones of the service requests corresponding to functions as a service provided by resources in the physical rack.

In Example 58, the subject matter of Example 57 can optionally include sending results to the client devices, the results corresponding to the service requests and generated by the functions as a service provided by the physical rack.

In Example 59, the subject matter of any one of Examples 57-58 can optionally include: receiving a pull request from the rack-level hardware queue manager, the pull request including a first identifier; and providing one of the service requests to the rack-level hardware queue manager in response to the pull request when the first identifier corresponds to a second identifier of the one of the service requests, the first identifier being at least one of a service type identifier or a service identifier.

In Example 60, the subject matter of any one of Examples 57-59 can optionally include that the rack-level hardware queue manager is located at a top-of-rack switch of the physical rack.

In Example 61, the subject matter of any one of Examples 57-60 can optionally include that the service parameters include at least one of deadlines or round-trip latencies by which results of corresponding ones of the service requests are to be received at corresponding ones of the client devices, and optionally include assigning priorities to the service requests based on the at least one of the deadlines or the round-trip latencies.

In Example 62, the subject matter of any one of Examples 57-61 can optionally include that the scheduling of the service requests in the queue is based on the assigned priorities of the service requests.

In Example 63, the subject matter of any one of Examples 57-62 can optionally include that the sending of the ones of the service requests from the queue to the rack-level hardware queue manager is based on the assigned priorities by first sending higher-priority ones of the service requests before sending lower-priority ones of the service requests.

In Example 64, the subject matter of any one of Examples 57-63 can optionally include programming the rack-level hardware queue manager of the physical rack with at least one of identifiers corresponding to the functions as a service provided by the physical rack or policy rules for prioritizing ones of the service requests in the physical rack.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. Edge gateway circuitry to schedule service requests in a network computing system, the edge gateway circuitry comprising:
    gateway-level hardware queue manager circuitry to:
        parse the service requests based on service parameters in the service requests; and
        schedule the service requests in a queue based on the service parameters, the service requests received from client devices; and
    hardware queue manager communication interface circuitry to send ones of the service requests from the queue to rack-level hardware queue manager circuitry in a physical rack, the ones of the service requests corresponding to functions as a service provided by resources in the physical rack.

2. The edge gateway circuitry of claim 1, further including client communication interface circuitry to send to client devices results corresponding to the service requests, the results generated by the functions as a service provided by the physical rack.

3. The edge gateway circuitry of claim 1, wherein the hardware queue manager communication interface circuitry is further to:
    receive a pull request from the rack-level hardware queue manager circuitry, the pull request including a first identifier; and
    provide one of the service requests to the rack-level hardware queue manager circuitry in response to the pull request when the first identifier corresponds to a second identifier of the one of the service requests, the first identifier being at least one of a service type identifier or a service identifier.

4. The edge gateway circuitry of claim 3, wherein the rack-level hardware queue manager circuitry is located at a top-of-rack switch of the physical rack.

5. The edge gateway circuitry of claim 1, wherein the service parameters include at least one of deadlines or round-trip latencies by which results of corresponding ones of the service requests are to be received at corresponding ones of the client devices, the edge gateway circuitry further including prioritizer circuitry to assign priorities to the service requests based on the at least one of the deadlines or the round-trip latencies.

6. The edge gateway circuitry of claim 5, wherein the gateway-level hardware queue manager circuitry is to schedule the service requests in the queue based on the assigned priorities of the service requests.

7. The edge gateway circuitry of claim 6, wherein the hardware queue manager communication interface circuitry is to send the ones of the service requests from the queue to the rack-level hardware queue manager circuitry based on the assigned priorities by first sending higher-priority ones of the service requests before sending lower-priority ones of the service requests.

8. The edge gateway circuitry of claim 1, further including system manager circuitry to program the rack-level hardware queue manager circuitry in the physical rack with at least one of identifiers corresponding to the functions as a service provided by the physical rack or policy rules for prioritizing ones of the service requests in the physical rack.

9. The edge gateway circuitry of claim 1, wherein the resources in the physical rack implement a virtual machine.

10. The edge gateway circuitry of claim 1, wherein the gateway-level hardware queue manager circuitry is located at an edge of a data center, within the rack-level hardware queue manager circuitry in the physical rack, and/or as drawer-level hardware queue manager circuitry implemented in drawers of the physical rack.

11. An apparatus to schedule service requests in a network computing system, the apparatus comprising:
    at least one memory;
    machine readable instructions;
    processor circuitry to at least instantiate or execute the machine readable instructions to:
        parse the service requests based on service parameters in the service requests;
        schedule the service requests in a queue based on the service parameters; and
        send ones of the service requests from the queue to rack-level hardware queue manager circuitry in a physical rack, the ones of the service requests corresponding to functions as a service provided by resources in the physical rack.

12. The apparatus of claim 11, wherein the processor circuitry is to send results to client devices, the results corresponding to the service requests and generated by the functions as a service provided by the physical rack.

13. The apparatus of claim 11, wherein the processor circuitry is to:
   receive a pull request from the rack-level hardware queue manager circuitry, the pull request including a first identifier; and
   provide one of the service requests to the rack-level hardware queue manager circuitry in response to the pull request when the first identifier corresponds to a second identifier of the one of the service requests, the first identifier being at least one of a service type identifier or a service identifier.

14. Rack-level hardware queue manager circuitry in a physical rack, the rack-level hardware queue manager circuitry comprising:
   request retriever circuitry to obtain service requests from a queue based on service parameters in the service requests; and
   drawer communication interface circuitry to send ones of the service requests from the queue to drawer-level hardware queue manager circuitry in a drawer of the physical rack, the drawer including a resource to provide a function as a service specified in one of the service requests.

15. The rack-level hardware queue manager circuitry of claim 14, wherein the rack-level hardware queue manager circuitry is located at a top-of-rack switch in the physical rack.

16. The rack-level hardware queue manager circuitry of claim 14, wherein to obtain the service requests, the request retriever circuitry is to generate a pull request including a first identifier.

17. The rack-level hardware queue manager circuitry of claim 16, wherein at least one of the service requests include a second identifier that corresponds to the first identifier, the first identifier being at least one of a service type identifier or a service identifier.

18. The rack-level hardware queue manager circuitry of claim 16, wherein the first identifier corresponds to the function as a service provided by the resource in the drawer or policy rules for prioritizing ones of the service requests in the physical rack.

19. The rack-level hardware queue manager circuitry of claim 14, wherein the service parameters include at least one of deadlines or round-trip latencies by which results of corresponding ones of the service requests are to be received at corresponding client devices.

20. The rack-level hardware queue manager circuitry of claim 14, wherein the resource in the drawer implements a virtual machine.

21. An apparatus in a physical rack to schedule service requests in a network computing system, the apparatus comprising:
   at least one memory;
   machine readable instructions;
   processor circuitry to at least instantiate or execute the machine readable instructions to:
      obtain service requests from a queue based on service parameters in the service requests; and
      send ones of the service requests from the queue to drawer-level hardware queue manager circuitry in a drawer of the physical rack, the drawer including a resource to provide a function as a service specified in one of the service requests.

22. The apparatus of claim 21, wherein the apparatus is located at a top-of-rack switch in the physical rack.

23. The apparatus of claim 21, wherein to obtain the service requests, the machine readable instructions cause the processor circuitry to generate a pull request including a first identifier.

24. The apparatus of claim 23, wherein at least one of the service requests includes a second identifier that corresponds to the first identifier, the first identifier being at least one of a service type identifier or a service identifier.

25. The apparatus of claim 23, wherein the first identifier corresponds to the function as a service provided by the resource in the drawer or policy rules for prioritizing ones of the service requests in the physical rack.

* * * * *